(12) United States Patent
Fuki et al.

(10) Patent No.: US 7,508,400 B2
(45) Date of Patent: Mar. 24, 2009

(54) DIGITAL MAP DATA PROCESSING SYSTEM

(75) Inventors: Tetuzo Fuki, Fukuoka (JP); Osamu Shibata, Fukuoka (JP); Kunihiro Kondoh, Fukuoka (JP); Kenichiro Tanaka, Fukuoka (JP)

(73) Assignee: Zenrin Co., Ltd. (JP)

( * ) Notice: Subject to any disclaimer, the term of this patent is extended or adjusted under 35 U.S.C. 154(b) by 397 days.

(21) Appl. No.: 11/384,014

(22) Filed: Mar. 16, 2006

(65) Prior Publication Data
US 2007/0226243 A1    Sep. 27, 2007

(30) Foreign Application Priority Data
Mar. 23, 2005    (JP) .......................... 2005-082843

(51) Int. Cl.
*G09G 5/00* (2006.01)

(52) U.S. Cl. ........................ 345/619; 345/418

(58) Field of Classification Search ............... 345/418, 345/619, 440; 701/200, 208, 201; 703/2
See application file for complete search history.

(56) References Cited

U.S. PATENT DOCUMENTS

| | | | | |
|---|---|---|---|---|
| 5,613,055 A | * | 3/1997 | Shimoura et al. ........... 345/473 |
| 5,815,161 A | * | 9/1998 | Emmerink et al. .......... 345/440 |
| 2001/0012981 A1 | * | 8/2001 | Yamashita et al. .......... 701/208 |
| 2003/0078724 A1 | * | 4/2003 | Kamikawa et al. .......... 701/208 |
| 2004/0212627 A1 | * | 10/2004 | Sumizawa et al. .......... 345/619 |
| 2005/0107993 A1 | * | 5/2005 | Cuthbert et al. ................ 703/2 |
| 2005/0270306 A1 | * | 12/2005 | Nomura ...................... 345/619 |

FOREIGN PATENT DOCUMENTS

| | | |
|---|---|---|
| JP | 6-83937 | 3/1994 |
| JP | 2002-333828 | 11/2002 |

* cited by examiner

*Primary Examiner*—Chante Harrison
(74) *Attorney, Agent, or Firm*—Beyer Law Group LLP

(57) ABSTRACT

A digital map data processing system is described that improves the appearance of a map without increasing the labor in automatic generation of road polygons required for generation of map data. The digital map data processing system reads network data, which expresses multiple roads by nodes and links, and generates polygon data including road polygons by processing the network data. The road polygon generation process includes generation of rectangular polygons of specified widths about respective links, generation of edge lines around polygons, and elimination of unnecessary edge lines. The digital map data processing system selectively applies a suitable terminal processing technique to specify terminal geometry of each object polygon, based on connection with each connection polygon and geometries and attributes of the object polygon and the connection polygon. This desirably improves the appearance at a connection of adjacent polygons.

18 Claims, 21 Drawing Sheets

Fig. 11

| Condition | All Connection Roads are Included in Road Class of Object Road |
|---|---|
| Terminal Processing Method | Specify Line Segment Connecting Intersections of Side Lines of Object Road and Connection Road as Terminal Geometry |

| | | |
|---|---|---|
| Processing Examples | Connection Road with Identical or Greater Width<br><br>AC≤90deg | |
| | Connection Road with Smaller Width<br><br>30deg<AC≤90deg | |
| | Connection Road with Smaller Width<br><br>AC≤30deg | |
| | AC>90deg | |

Fig. 12

| Condition | | Some Connection Roads are Included in Road Class of Object Road |
|---|---|---|
| Processing Examples | Connection Road with Identical or Greater Width<br>AC≤90deg | Specify Line Segment Connecting Intersections of Side Lines of Object Road and Connection Road as Terminal Geometry<br>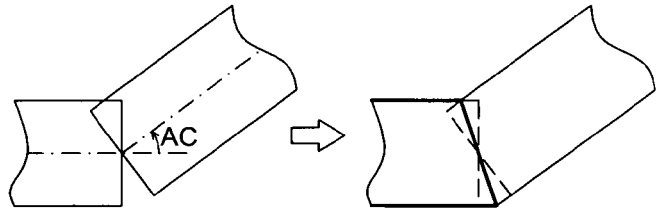 |
| | Connection Road with Smaller Width<br>30deg< AC ≤90deg | Specify Line Segment Connecting Intersections of Side Lines of Object Road and Connection Road as Terminal Geometry<br>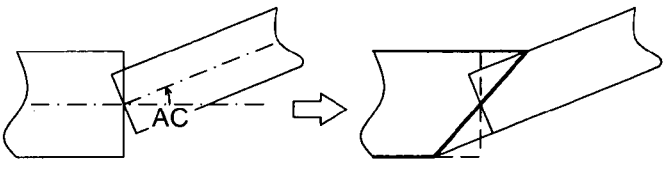 |
| | Connection Road with Smaller Width<br>AC≤30deg | 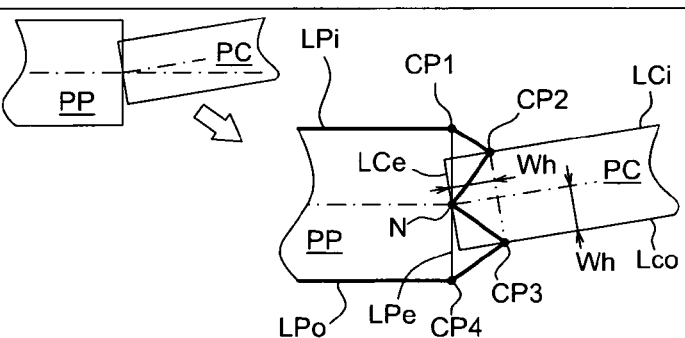 |
| | AC>90deg | Polygon Convex Process<br>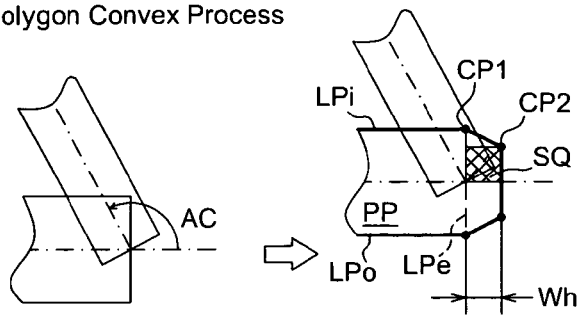 |

Fig. 14

| Condition | | a) No Connection Roads are Included in Road Class of Object Road<br>b) Some Connection Roads may be Included in Identical Road Class |
|---|---|---|
| Processing Examples | Connection Road with Greater Width | Wpp, PC, PP, Wpc |
| | Connection Road with Identical Width<br>AC≤90deg | Specify Line Segment Connecting Intersections of Side Lines of Object Road and Connection Road as Terminal Geometry |
| | Connection Road with Smaller Width<br>AC≤90deg | Polygon Convex Process<br>LPi, CP1, LCP, LCi, PC, CP2, LCe, PP, LPe, LCo, Wh, LPo, SQ |
| | Connection Road with Identical or Smaller Width<br>AC>90deg | Polygon Convex Process<br>LPi, CP1, CP2, SQ, PP, LPo, LPe, Wh |

Fig.15

| No. | Road Class | Connection Road to be Processed | Connection Status | Processing Technique of Terminal Geometry | |
|---|---|---|---|---|---|
| 1 | All Connection Roads are Included in Road Class of Object Road | Connection Road with Minimum Connection Angle or Connection Road of Identical Group | Identical or Greater Width AC≤90deg or Smaller Width 30deg<AC≤90deg | Connection Process | |
| 2 | | | Smaller Width AC≤30deg | M-Shape Process | |
| 3 | | | Smaller Width AC > 90deg | Connection Process & Fillet Process | |
| 4 | Some Connection Roads are Included in Road Class of Object Road | Connection Road with Minimum Connection Angle or Connection Road of Identical Group among Connection Roads in Road Class of Object Road | Identical or Greater Width AC≤90deg or Smaller Width 30deg<AC≤90deg | Connection Process | |
| 5 | | | Smaller Width AC≤30deg | M-Shape Process | |
| 6 | | | AC > 90deg | Polygon Convex Process | |
| 7 | No Connection Roads are Included in Road Class of Object Road (All Connection Roads are in Different Road Classes or Some Connection Roads are in Identical Road Class) | Connection Road with Minimum Connection Angle among Connection Roads in Different Road Classes | Wider Width | No Processing | |
| 8 | | | Identical Width AC≤90deg | Connection Process | |
| 9 | | | Smaller Width AC≤90deg | Polygon Convex Process | |
| 10 | | | Identical or Smaller Width AC > 90deg | Polygon Convex Process | |

'Width': Width of Connection Road          AC = Connection Angle

Fig. 17

| No. | Road Class | Connection Status | Processing Technique of Terminal Geometry |
|---|---|---|---|
| 1 | No Connection Road | — | Rectangle |
| 2 | All Included in Road Class of Object Road | — | Connection Process |
| 3 | Some Included in Road Class of Object Road | With Continuity | Connection Process |
| 4 | | Without Continuity | Polygon Convex Process |
| 5 | None Included in Road Class of Object Road (Some Connection Roads in Identical Road Class) | — | Polygon Convex Process |
| 6 | All Connection Roads in Different Road Classes (Some Having Identical Width with Object Road) | With Continuity | Connection Process |
| 7 | | Without Continuity | Polygon Convex Process |
| 8 | All Connection Roads in Different Road Classes (None Having Identical Width with Object Road) | Any Connection Road Having Greater Width than Object Road | Rectangle |
| 9 | | All Connection Roads Having Smaller Width than Object Road | Polygon Convex Process |

'Width': Width of Connection Road

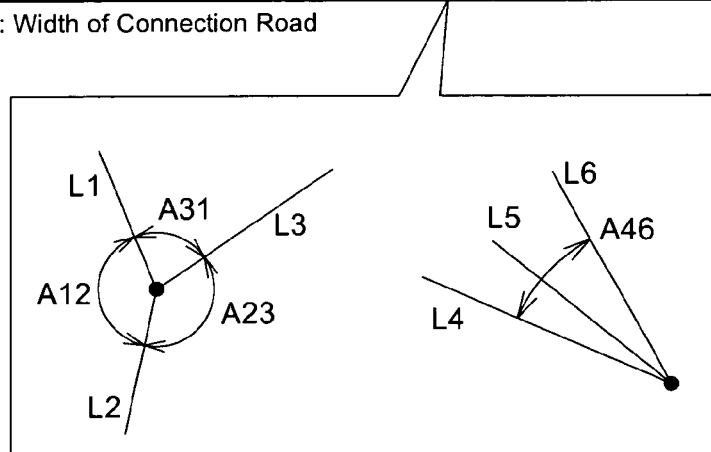

DIGITAL MAP DATA PROCESSING SYSTEM

BACKGROUND OF THE INVENTION

1. Field of the Invention

The present invention relates to a technique of generating map data required for drawing or displaying a map.

2. Description of the Related Art

Digital map data are used for display of maps on the screen of a computer or a navigation system. The digital map data consist of diverse polygon data representing roads, railways, constructions, and variety of other features. Various techniques have been proposed to automatically generate such polygon data, especially road polygon data for the relieved load on generation of the digital map data.

For example, a technique disclosed in Japanese Patent Laid-Open Gazette No. H06-83937 utilizes path finding data or network data consisting of nodes and links and automatically generates road polygons of preset widths from link data. Another proposed technique adjusts a polygonal line connection between adjacent road polygons to smooth arc geometry or adjusts a connection of adjacent road polygons with different widths to tapered geometry. Another technique disclosed in Japanese Patent Laid-Open Gazette No. 2002-333829 generates road polygons of preset widths from network data and subsequently generates edge line data of the road polygons, based on the spatial relation of the road polygons, for example, based on determination of whether any generated road polygon represents an elevated road.

Some of major requirements for the digital map data are the improved appearance of a resulting map and the relieved load on generation of digital map data. Roads may be color coded according to their road classes, for example, national highways or prefectural roads. The conventional color code technique may, however, cause some awkwardness in display of road polygons of certain geometry at an intersection between a national highway and a prefectural road. This damages the appearance of a resulting map. The operator's manual adjustment of such awkward display for the improved map appearance undesirably requires the heavy load for generation of map data.

When two practically parallel roads are located close to each other, for example, when an up lane and a down lane are formed by separate links or when a ground road runs parallel to an elevated road, the conventional automatic polygon generation technique may cause an overlap of two road polygons representing these two practically parallel roads. In order to avoid the awkwardness in display of map drawing, the typical procedure gives priority to one of the overlap polygons and eliminates the edge lines of the other overlap polygon. Uniform priority setting and uniform elimination of edge lines between the two practically parallel roads are essential for leaving the continuous edge lines of the overlap polygons in the map. Such elimination of the edge lines is manually specified by the operator and thus requires the extremely heavy load. In order to eliminate such drawbacks of the prior art techniques, the object of the present invention is to provide a technique of automatically generating road polygons with less awkwardness in display of map drawing.

SUMMARY OF THE INVENTION

The present invention is directed to a digital map data processing system that generates map data required for drawing or displaying a map. The digital map data processing system inputs first inputs geometric data and attributes required for specification of geometry of multiple road polygons, which are used to draw roads included in the map data. The digital map data processing system selects one of multiple terminal processing techniques to be applied for specification of terminal geometry of each road polygon, based on at least part of attributes of an object road as a processing target and a connection road to be connected to the object road, geometry of the object road and the connection road determined by the input geometric data, and directions of the object road and the connection road. The digital map data processing system applies the selected terminal processing technique to specify the terminal geometry of each road polygon according to the geometric data and generates polygon data required for drawing the road polygons. The selection may include an option of selecting none of the multiple terminal processing techniques. In this case, the original geometry defined by the input geometric data is directly used for generation of polygon data.

The digital map data processing system of the invention takes into account the attributes or other factors of each connection road and applies the optimum processing technique to specify the terminal geometry of the object road for smooth connection with the connection road. The selective use of the multiple terminal processing techniques desirably reduces the awkwardness in display of map drawing. The arrangement of the invention requires relatively light load for generation of road polygons with less awkwardness in display of map drawing.

The geometric data may be given polygon data in a basic form or may be any data usable for generation of polygon data by the digital map data processing system. For example, the geometric data may be network data that represents connection of plural roads by means of nodes and links. The digital map data processing system utilizes such geometric data to generate polygon data. Here the links represent roads by means of line segments and polygonal lines, and the nodes represent end points of the links.

The geometry of each road polygon about one link may be defined by the specified terminal geometry of the road polygon and side lines of the road polygon given as sets of points located at preset distances about the link. The terminology 'distance' in the specification hereof represents a length in the direction perpendicular to the link. One available procedure may obtain polygonal line data and line segment data representing the side lines and the terminal geometry and compose the polygonal line data and the line segment data to generate polygon data. Another available procedure may provisionally generate rectangular polygon data of a specified width about each link as the axis of symmetry and modify the terminal geometry of the provisional rectangular polygon data to generate final polygon data. The distance from each link or the width of each rectangular polygon may be determined according to the attributes allocated to the link, for example, information regarding the road class such as national highway or prefectural road, the number of lanes on the road, or the road width.

The digital map data processing system of the invention selectively uses the multiple terminal processing techniques for specification of the terminal geometry of the object road as mentioned above. The terminology 'selection' in the specification hereof includes the requirement or the non-requirement for adjustment of the terminal geometry. A mode of selecting the execution or non-execution of adjustment of the terminal geometry according to some conditions is thus included in the scope of the invention.

The selective use of the multiple terminal processing techniques may be based on various conditions. For example, the selection may be based on a result of comparison between road classes of the object road and the connection road. In this application, the selection may be based on another condition in combination with the result of comparison between the road classes of the object road and the connection road.

At an intersection, there may be plural connection roads to be connected with an object road. In such cases, the digital map data processing system may change over conditions for the selection of the terminal processing technique between a case where all the plural connection roads and the object road are included in an identical road class and any other case. For example, the color or the pattern of each road in map drawing may be selected according to its road class. When all the plural connection roads and the object road are of an identical road class, all the corresponding road polygons are filled with an identical color or an identical pattern. The terminal geometries of such polygons have no significant influence on the appearance of a resulting map. When there is any connection road in a different road class from the road class of the object road, the terminal geometry of the corresponding road polygon significantly affects the appearance of the resulting map. The changeover of the conditions for the selection of the terminal processing technique based on the identities of the road classes of the object polygon and the connection polygons enables application of the suitable processing technique for specification of the terminal geometry of each polygon to enhance the appearance of the resulting map without any significant increase of the processing load.

The digital map data processing system may change over conditions for the selection of the terminal processing technique between a case where any of the plural connection roads and the object road are included in an identical road class and any other case. When there are plural connection roads relative to one object road, the selection of the terminal processing technique may be based on not only the result of comparison between the road classes of the object road and the connection road but the result of comparison between the road classes of the plural connection roads. For example, the conditions for the selection of the terminal processing technique may be changed over between a case where any two or more connection roads are of an identical road class and any other case.

In another preferable application, the digital map data processing system of the invention may select the terminal processing technique, based on at least either a result of comparison between widths of the object road and the connection road and a connection angle between the object road and the connection road. Here the terminology 'connection angle' represents an angle between the axes of symmetry of adjacent polygons or an angle between the vector of the symmetry axis of one polygon and the vector of the symmetry axis of an adjacent polygon. Specification of the terminal geometry of each polygon based on these factors further improves the appearance of the resulting map. For example, the conditions for the selection of the terminal processing technique may be changed over between a case where the connection road and the object road have an identical width and a case where the connection road and the object road have different widths. The latter may be further divided into a case where the object road has a greater width than the width of the connection road and a case where the object road has a smaller width than the width of the connection road.

The terminal geometry of each polygon may be specified by any of various processing techniques. One available processing technique defines the terminal geometry of a road polygon representing the object road by a line segment that interconnects cross points of side lines of the object road and side lines of the connection road. The rectangular terminal of the road polygon may be partly eliminated, partly extended, or partly eliminated and extended according to the positions of the cross points. When an acute corner appears in the course of such terminal processing, the fillet process may be adopted to adjust the acute corner to an arc.

When the connection road has a relatively shallow connection angle to the object road, interconnection of the cross points of the side lines may give an undesirably irregular terminal geometry. In such cases, the terminal geometry of the object road may be specified with points on the side lines of the connection road apart from an end point of the object road by a preset distance.

Another available processing technique defines the terminal geometry of a road polygon representing the object road by a polygonal line that interconnects side lines of the object road to express the object road as a convex polygon. The convex polygon has a convex terminal geometry with no protrusion of any diagonal lines from the polygon. The use of the convex polygon desirably avoids the awkward appearance of the terminal geometry of the object road at an intersection or at any connection with another road, due to the different road classes, the different road widths, or the connection angle. The terminal geometry of the object road may be defined by interconnecting the side lines by a polygonal line formed in any of various ways. The terminal geometry of the object road may be defined by interconnecting the side lines by an arc curve or any other convex curve, instead of the polygonal line.

The selective use of the multiple terminal processing techniques may have various applications. One possible application groups plural road polygons by their road name, road class, traffic regulation, connection angle or up-lane and down-lane information and selectively use one of the terminal processing techniques based on a result of such grouping. The digital map data processing system of the invention may have a function of generating and managing diversity of other polygon data representing geography, constructions, and other features, in addition to the functions of generating road polygon data.

Various conditions may be used for grouping road polygons. For example, at least one of the road name and the traffic regulation may be used for grouping road polygons. Plural road polygons with an identical name or plural road polygons under continuous traffic regulation, for example, continuous one-way restriction, are generally regarded as a continuous road. Grouping of such road polygons enables map drawing according to the generally accepted notion. At a Y-shaped intersection, a connection road having a shallower connection angle to the object road is recognized as a continuation road of the object road. The connection road with the shallower connection angle is thus grouped with the object road. The 'continuation roads' are generally regarded as one continuous road, because of their geometrical configurations. The terminology 'continuation roads' in the specification hereof represent any set or roads regarded as one continuous road, based on their geometrical configurations, traffic regulations, road names, and road classes. Grouping the 'continuation roads' enables these roads to be consistently processed in the polygon generation process or in the subsequent edge line generation process, thus enhancing the appearance of the resulting map. The expression 'continuity' in the specification hereof is similar to the concept of 'continuation road'. The 'continuity' is evaluation based on the geometrical configurations of the roads. Roads having a connection angle of not greater than a preset value, for example, 30 degrees, are regarded to have the continuity.

When the attributes include a road class of each road represented by each road polygon, road polygons of an identical road class may be set in one group. All of road polygons in an identical road class may be set in one group, or part of road polygons in an identical road class satisfying another predetermined condition may be set in one group. Road polygons generally recognized as one continuous road are typically in an identical road class. The color coding or pattern coding technique typically allocates different colors or different patterns to different road classes. Grouping of road polygons in an identical road class desirably standardizes the polygon data generation according to these actual situations.

The connection angles of the multiple road polygons may be used for the grouping. As defined previously, the connection angle represents an angle between the axes of symmetry of adjacent polygons or an angle between the vector of the symmetry axis of one polygon and the vector of the symmetry axis of an adjacent polygon. The smaller connection angle between adjacent road polygons gives the higher potential for a continuous road. This arrangement thus ensures the adequate grouping of road polygons according to the generally accepted notion.

The grouping technique is effectively applicable in various steps of polygon data generation, for example, a step of filling polygons with preset colors or patterns and a step of adjusting the terminal geometry of each polygon. The grouping technique is especially effective in edge line processing to add edge line data representing edge lines of roads to corresponding polygons. Generation of edge line data to give continuous edge lines of polygons set in one identical group desirably improves the appearance of a resulting map.

Adjustment of the terminal geometry at a connection of adjacent polygons may be required for the improved appearance of a map. A preferable procedure of the terminal geometry adjustment selects a suitable processing technique among multiple options, in response to a requirement for the adjustment, based on at least part of the attributes, geometry, and directions of an object road as a processing target and a connection road to be connected with the object road. The selection of the processing technique may be based on whether the connection road and the object road are set in one identical group or whether some of the connection road polygons are set in one identical group. This arrangement ensures the continuity of geometry for adjacent polygons to be regarded as a continuous road.

The digital map data processing system of the invention may not have all the characteristics described above but may be constructed with omission of some characteristics or with adequate combination of some characteristics. The technique of the invention is not restricted to the digital map data processing system but may be actualized by a digital map data processing method that is performed by the computer to generate map data, by a computer program that causes the computer to attain various functions required for generation of map data, or by a recording medium that stores such a computer program therein. Typical example of the recording medium include flexible disks, CD-ROMs, magneto-optical disks, IC cards, ROM cartridges, internal storage devices (memories such as RAMs and ROMs) and external storage devices of computer, and diversity of other computer readable media.

BRIEF DESCRIPTION OF THE DRAWINGS

FIG. 11 shows terminal processing method (1);

FIG. 12 shows terminal processing method (2);

FIG. 14 shows terminal processing method (3);

FIG. 15 shows a list of terminal processing methods;

FIG. 17 shows a list of terminal processing methods in one modified example;

DESCRIPTION OF THE PREFERRED EMBODIMENTS

Figure 1:
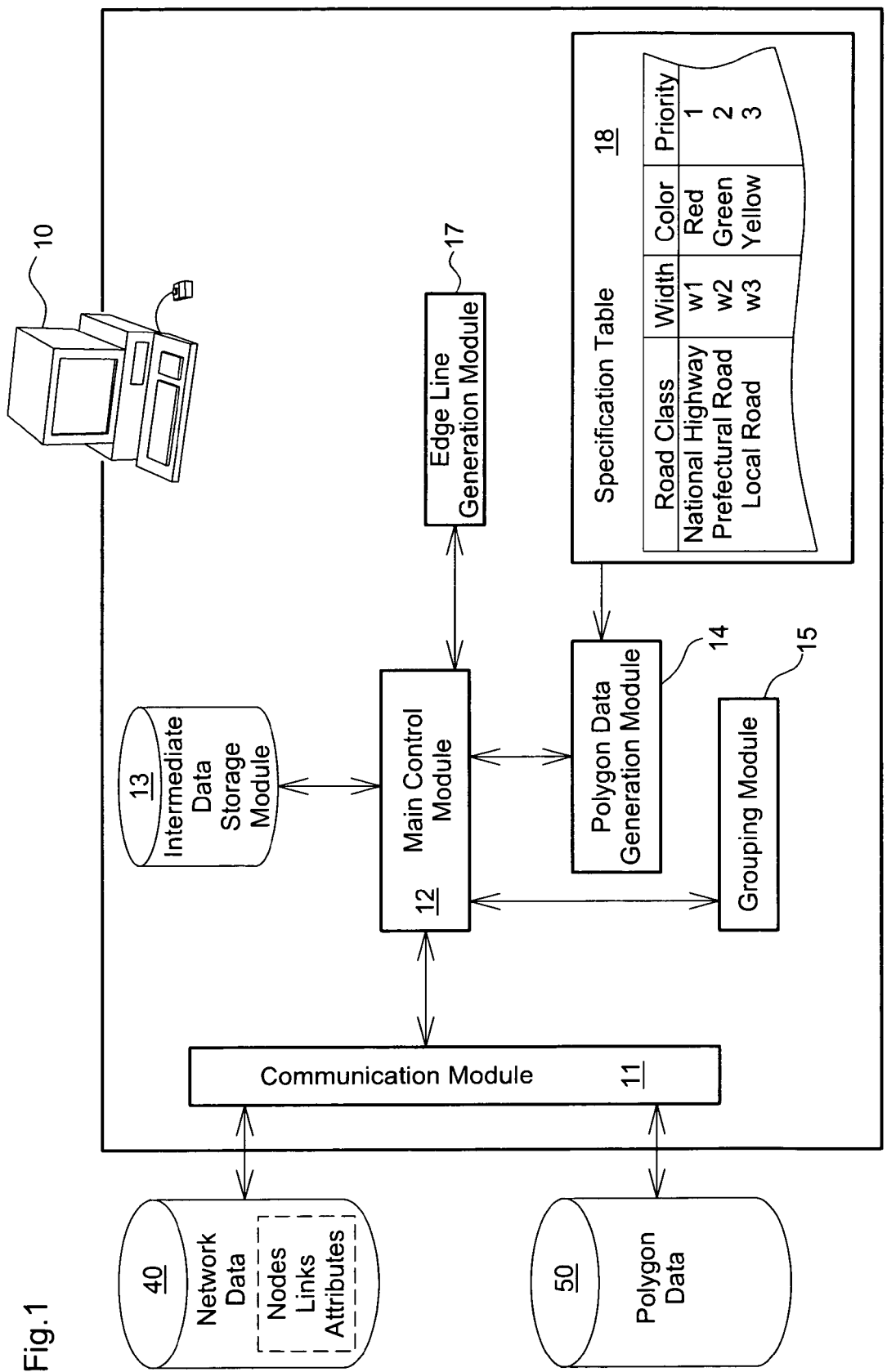
FIG. 1 schematically illustrates the configuration of a digital map data processing system in one embodiment of the invention.

One mode of carrying out the invention is described below as a preferred embodiment in the following sequence.
A. System Configuration
B. Road Polygon Generation Process
C. Polygon Generation Process
D. Polygon Grouping Process
E. Polygon Terminal Processing
E1. Processing Techniques
E2. Processing when All Connection Roads are Included in Road Class of Object Road
E3. Processing when Some Connection Roads are Included in Road Class of Object Road
E4. Processing when No Connection Road is Included in Road Class of Object Road
E5. List of Conditions for Selection of Polygon Terminal Processing Techniques and Flowchart of Polygon Terminal Processing
E6. Selection of Polygon Terminal Processing Techniques (Modified Example)
F. Edge Line Generation Process
G. Effects and Modifications A. System Configuration FIG. 1 schematically illustrates the configuration of a digital map data processing system 10 in one embodiment of the invention. The digital map data processing system 10 is constructed by installing a computer program in a general-purpose computer to attain various functions required for generation of map data. The functional blocks of the digital map data processing system 10 are shown in FIG. 1. These functional blocks are actualized by the software configuration in this embodiment but may alternatively be constructed by ASIC or any other hardware configuration.

The digital map data processing system 10 generates polygon data 50 based on network data 40. In the structure of this embodiment, the network data 40 and the polygon data 50 are respectively provided and managed by servers, which individually connect with the digital map data processing system 10 via a network. The network may be a restricted network like a LAN or a wide area network like the Internet. The network data 40 and the polygon data 50 may otherwise be stored and managed within the digital map data processing system 10.

The network data 40 are used for path finding and represent connection of multiple roads by means of nodes and links. The network data 40 additionally have attribute information allocated to the respective nodes and links. The attribute information includes the road class, such as national highway, prefectural road, or local road, the number of lanes on the road, the name of the road, and the altitude level of the road.

The altitude level data expresses the height of each road by a quantized value. In this embodiment, the altitude level data are given as integral values −1, 0, 1, 2. The integral value '−1' is allocated to underground and semi-underground roads. The integral value '0' is allocated to general roads on the ground level. The integral values '1' and '2' are allocated to elevated roads. There may be multi-level elevated roads, which are expressed by these two different values. The higher value means the upper-level elevated roads. Such altitude level data advantageously save the total data volume required for expressing the spatial relation of multiple roads, compared with direct storage of height data of the respective roads as numerical data.

The polygon data 50 are given as a database for storing and managing polygons used for map drawing. The terminology 'polygon data' is also used in the description hereafter as representation of data for drawing the respective polygons. The polygon data 50 as the data for drawing polygons are divided for separate storage into layers representing geography, layers representing roads and railways, and layers representing constructions and other features. The digital map data processing system 10 of this embodiment generates only road polygons used for drawing the roads, among the polygon data 50, based on the network data 40. The other polygons of geography, railways, constructions and other features are separately generated by the operator's individual works.

The illustration of FIG. 1 includes functional blocks required for automatic generation of road polygons. These functional blocks are executed in cooperation under management of a main control module 12 to attain map data generation functions, more specifically automatic generation functions of road polygons.

A communication module 11 controls reading and writing of the network data 40 and the polygon data 50 via the network. An intermediate data storage module 13 temporarily stores and manages various data generated in the course of generation of road polygons. A polygon data generation module 14 generates rectangular polygons representing road geometry, based on link data of the network data 40. A specification used for generation of polygons is given by a specification table. In the structure of this embodiment, the polygon data generation module 14 provisionally generates rectangular polygons and subsequently adjusts the terminal geometry of these rectangular polygons as described later. One possible modification may generate, at this stage, only polygonal line data or line segment data as sets of points apart by fixed distances from respective links of the link data. Polygon data may be generated after adjustment of the terminal geometry.

As illustrated, the specification table 18 specifies defaults in widths, filling colors, and priorities of polygons corresponding to respective road classes. The priorities of polygons are given as control information for specifying a drawing order of the polygons. Polygons of the higher priorities are drawn over other polygons and are thus preferentially displayed on a map without being cut or hidden by other polygons. The specification table 18 only specifies the defaults. When the attribute information included in the network data 40 specifies the relevant values, for example, widths of polygons, the polygon data generation module 14 preferentially uses the attribute information. The polygons generated by the polygon data generation module 14 are only intermediate data and are stored in the intermediate data storage module 13.

A grouping module 15 groups multiple polygon data stored in the intermediate data storage module 13 according to a preset rule. In this embodiment, multiple polygons representing roads generally regarded as parts of one continuous road are collected to one group. Polygons to be collected in one group are, for example, polygons representing roads having an identical road name like 'Route X', polygons representing roads under one-way restriction in an identical direction, or polygons representing roads connecting at a shallow angle and facing in a practically identical direction. The method of such grouping will be described later in detail.

The polygon data generation module 14 adjusts the terminal geometry of the road polygons stored in the intermediate data storage module 13. The initial polygons generated according to the link data in the network data 40 are rectangular in shape, so that connection of adjacent polygons may give an irregular road outline. The polygon data generation module 14 thus refers to the attributes and a connection angle of adjacent polygons to be connected and adjusts the terminal geometry of these adjacent polygons to eliminate the awkwardness of map drawing. The method of adjusting the terminal geometry of polygons will be described later in detail.

An edge line generation module 17 generates edge lines of the road polygons having the adjusted terminal geometry. Unnecessary edge lines are eliminated afterwards by taking into account the altitude level of the roads, for example, elevated roads or roads intersecting on the ground. Integral processing of polygons included in one group gives continuous edge lines to a group of roads expressed by these polygons. The concrete method of edge line generation will be described later in detail.

The digital map data processing system 10 automatically generates road polygons through the processing of the respective functional blocks described above. The eventually generated road polygons are stored as the polygon data 50. The general flow of generating road polygons and the individual processing flows are described below in detail.

B. Road Polygon Generation Process

Figure 2:
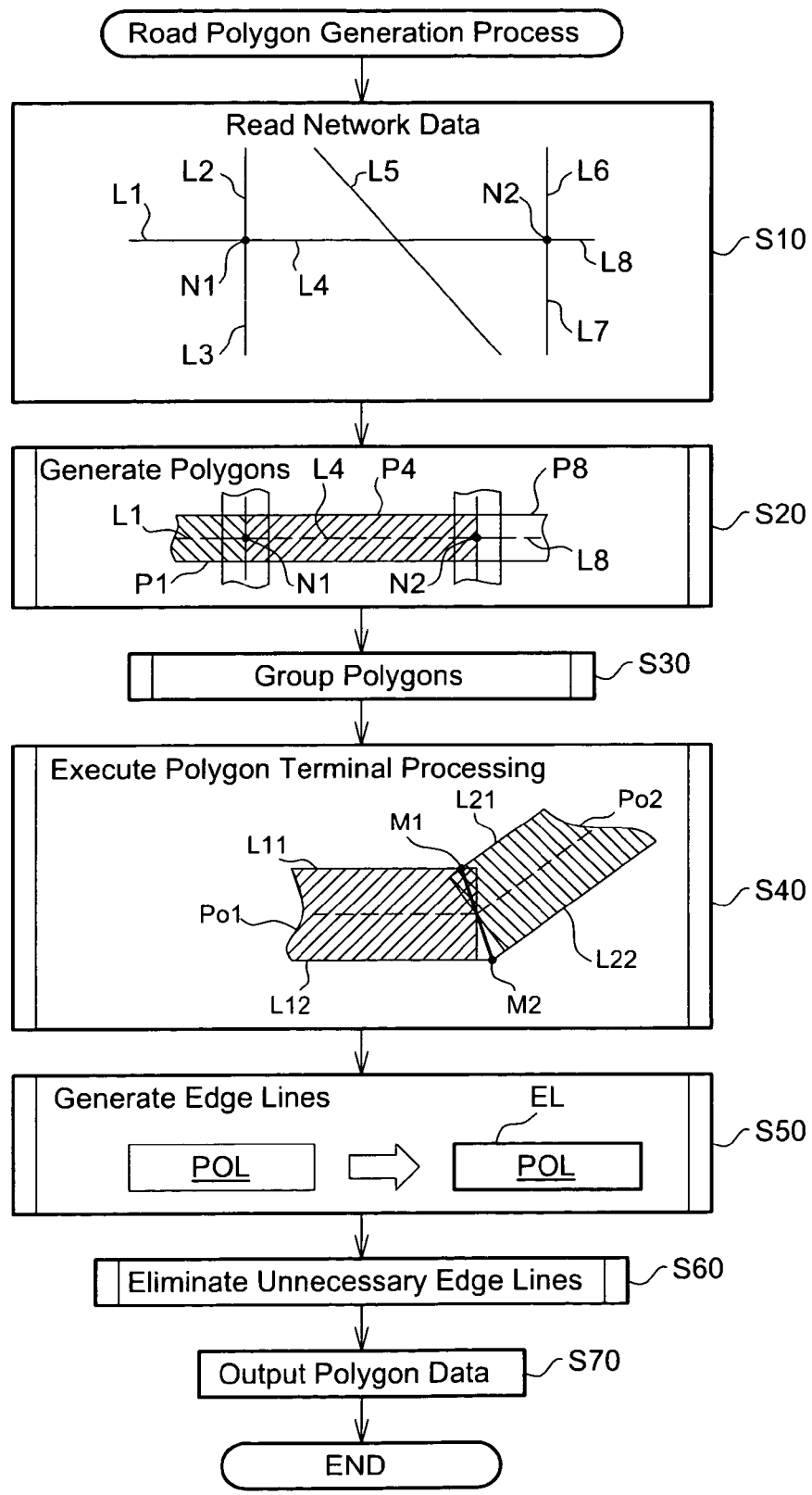
FIG. 2 is a flowchart showing a road polygon generation process.

FIG. 2 is a flowchart showing a road polygon generation process, which is attained by the cooperation of the respective functional blocks shown in FIG. 1. The CPU of the personal computer constructing the digital map data processing system 10 executes the road polygon generation process according to a computer program.

In the road polygon generation process, the CPU first reads the network data 40 (step S10). The illustration includes the schematic structure of one example of the network data 40. The network data 40 consists of links representing roads as linear segments and nodes as crosspoints or end points of the links. The illustrated example includes links L1 to L8 and nodes N1 and N2. The links L4 and L5 cross in a second-dimensional manner but do not have a node at their crosspoint. This means that the links L4 and L5 are elevated roads and have no point of intersection.

The CPU then generates polygons from the links included in the network data 40 (step S20). The illustration includes an example of polygons P1, P4, and P8, which are generated from the links L1, L4, and L8. The polygon generation process will be described later in detail and is here described only briefly. The polygon generation process generates rectangular polygons about the respective links as axes of symmetry. The width of each rectangular polygon representing a road depends upon its road class. In this embodiment, the ratio of the widths of polygons is set as 3:2:1 corresponding to national highways, prefectural roads, and local roads. When express highways are regarded as an additional road class, the ratio of the widths of polygons may be set as 5:4:3:2 corresponding to express highways, national highways, prefectural roads, and local roads. The adjoining polygons are interconnected by a node; for example, the polygons P1 and P4 (respectively filled with different hatched lines) are interconnected by the node N1. Multiple polygons are overlapped at nodes as connection points of three or more links, for example, the nodes N1 and N2. The widths of polygons may be set individually for the respective roads, irrespective of their road classes.

The CPU then groups the generated polygons according to a preset rule (step S30). The links in the network data 40 are separated by nodes located at intersections, so that the polygons generated from the links are also separated by the nodes. One continuous road, for example, Route X, is thus expressed by a set of plural polygons. The grouping process collects plural polygons representing roads regarded as parts of one continuous road into one group. The details of the grouping process will be described later.

The CPU subsequently executes polygon terminal processing to process the terminals of the generated polygons (step S40). The polygons generated at step S20 are rectangular in shape, so that there may be a gap or an extra protrusion at a connection of some adjacent polygons. The polygon terminal processing adjusts the terminal geometry of adjacent polygons according to their connection status. The polygons are closed figures and do not have any terminals in a strict sense. In the specification hereof, the terminology 'polygon terminals' represent sides including ends of links or roads.

The illustration includes one example of typical polygon terminal processing. In the illustrated example, two polygons Po1 and Po2 cross at a shallow connection angle. The respective polygons Po1 and Po2 are rectangular in shape before the polygon terminal processing as shown by different hatched lines. The polygon terminal processing specifies crosspoints M1 and M2 between side lines L11 and L12 of the polygon Po1 and side lines L21 and L22 of the polygon Po2 and adjusts the terminal geometry of the polygon Po1 to have a line segment interconnecting the crosspoints M1 and M2 as a terminal. The polygon terminal processing selectively adopts multiple processing techniques including this typical procedure by taking into account the road classes and other relevant conditions. The details of the polygon terminal processing will be described later.

After the polygon terminal processing, the CPU generates edge lines of the polygons (step S50). The illustration includes one example of edge line processing. In the illustrated example, a polygon POL does not have edge lines before the edge line generation process but has edge lines EL surrounding the whole circumference of the polygon POL after the edge line generation process.

Some edge lines generated at connections of adjacent roads are unnecessary and give the poor appearance as if one continuous road is physically separated. The CPU accordingly eliminates such unnecessary edge lines from the generated edge lines (step S60). The details of the elimination of unnecessary edge lines will be described later.

The CPU outputs the processed polygons as road polygons to the polygon data 50 (step S70) and terminates this road polygon generation process. The road polygon generation process of this embodiment is automatically executed without any intervention but may be intervened by the operator's instructions. For example, the operator may check the result of processing on completion of each processing step in the road polygon generation process of FIG. 2. When there is any inadequate result of processing, the operator may modify or change the processing result appropriately. The processing flow of this embodiment sequentially executes the polygon generation (step S20), the grouping (step S30), the polygon terminal processing (step S40), the edge line generation (step S50), and the unnecessary edge line elimination (step S60) with regard to all the links included in the network data. One possible modification may individually execute the series of processing (steps S20 to S60) with regard to each link. The modified processing flow sequentially changes an object link selected as a processing target and repeats the series of processing to generate polygon data corresponding to all the links included in the network data. The details of the respective processing steps in the road polygon generation process are described below.

C. Polygon Generation Process

Figure 3:
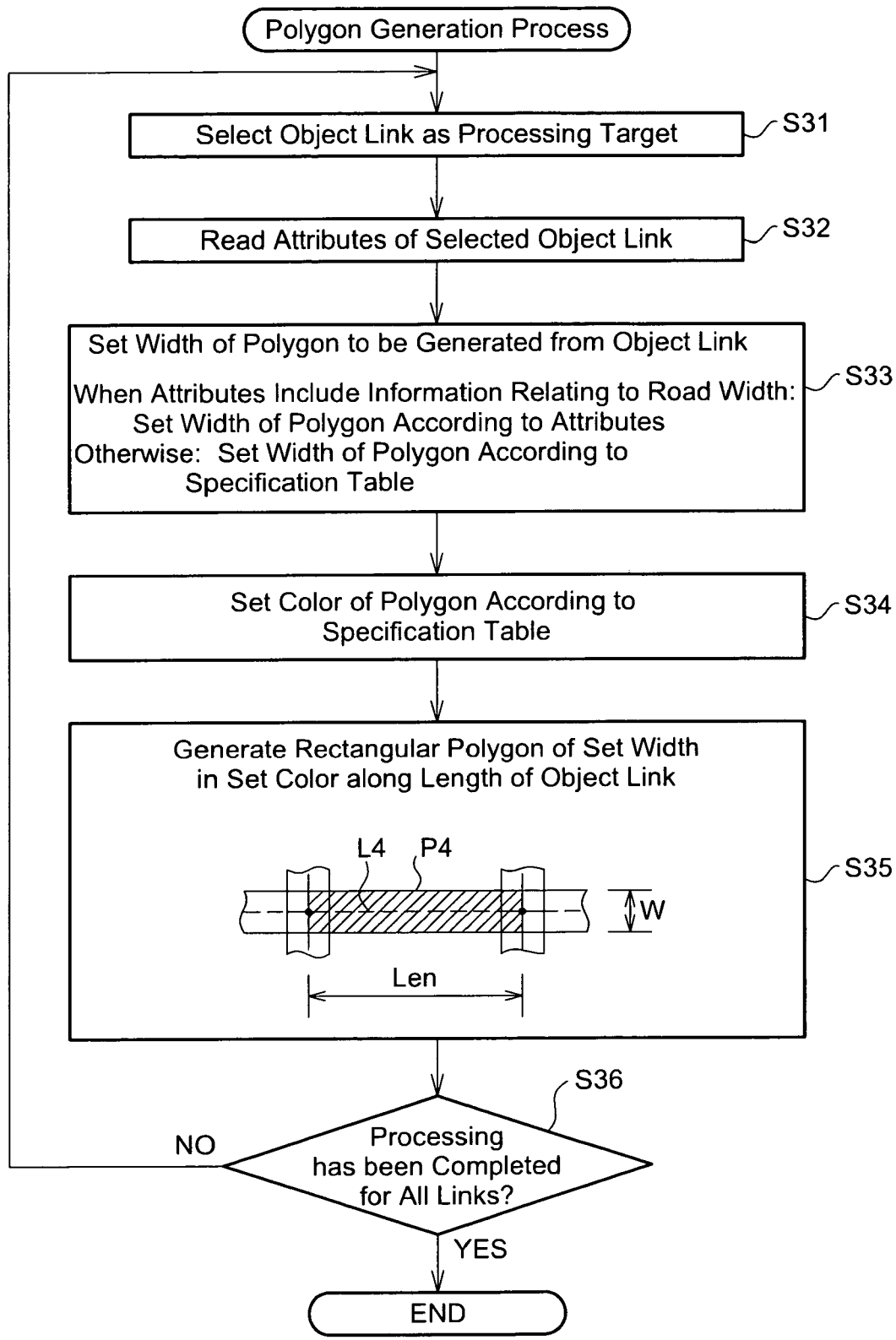
FIG. 3 is a flowchart showing a polygon generation process.

FIG. 3 is a flowchart showing the details of the polygon generation process executed at step S20 in the road polygon generation process (see FIG. 2). The polygon generation process gives widths to the respective links to generate rectangular polygons.

In the polygon generation process, the CPU sequentially selects one object link as a processing target in a predetermined order (step S31) and reads the attributes of the selected object link (step S32). The attributes include, though not essential, the road class, the number of lanes on the road, and the width of the road.

The CPU subsequently sets the width of a polygon to be generated from the object link (step S33). When the attributes read at step S32 include information relating to the road width, the width of the polygon is set based on the relevant information. For example, when the road width is given as an attribute, the width of the polygon is determined according to the road width. When the number of lanes is given as an attribute, the width of the polygon is determined according to a standard value preset for the width of each lane. When the attributes do not include such information, the default stored in the specification table (see FIG. 1) is set to the width of the polygon.

The CPU then sets the color of the polygon according to the specification table (step S34). The procedure of this embodiment color-codes the polygon corresponding to the road class. When the attributes read at step S32 do not include the road class, the CPU specifies the color of the polygon on the assumption of a local road. The color-coding of the polygon may take into account other conditions, such as the number of lanes, as well as the road class. Otherwise the color-coding of the polygon may not depend on the road class but may be based on the other conditions, such as the number of lanes.

The CPU then sets the object link as an axis of symmetry and specifies a set of points having a width W about the respective points on the link to generate a rectangular polygon (step S35). In the illustrated example, a polygon P4 is generated from a link L4 specified as an axis of symmetry. The polygon P4 is a rectangle having the set width W and a length Len of the link L4. The link L4 in this example is a linear line segment. A link given as a polygonal line segment is processed in the similar manner. In this case, the polygon generation process specifies a set of points having the width W about the respective points on the polygonal link to generate a polygon having polygonal side lines and straight end lines.

The CPU repeats the above series of processing to generate polygons from all the links included in the network data. The CPU terminates the polygon generation process on completion of the processing with regard to all the links (step S36). The generated polygons are stored in the intermediate data storage module 13 (see FIG. 1) and go through a subsequent series of processing. The polygon generation process of this embodiment generates provisional polygon data representing rectangular polygons. One possible modification may not generate polygon data at this stage but specify only a set of polygonal lines or a set of line segments defining the contours of respective polygons. In this modification, polygon data may be generated after completion of the polygon terminal processing.

D. Polygon Grouping Process

Figure 4:
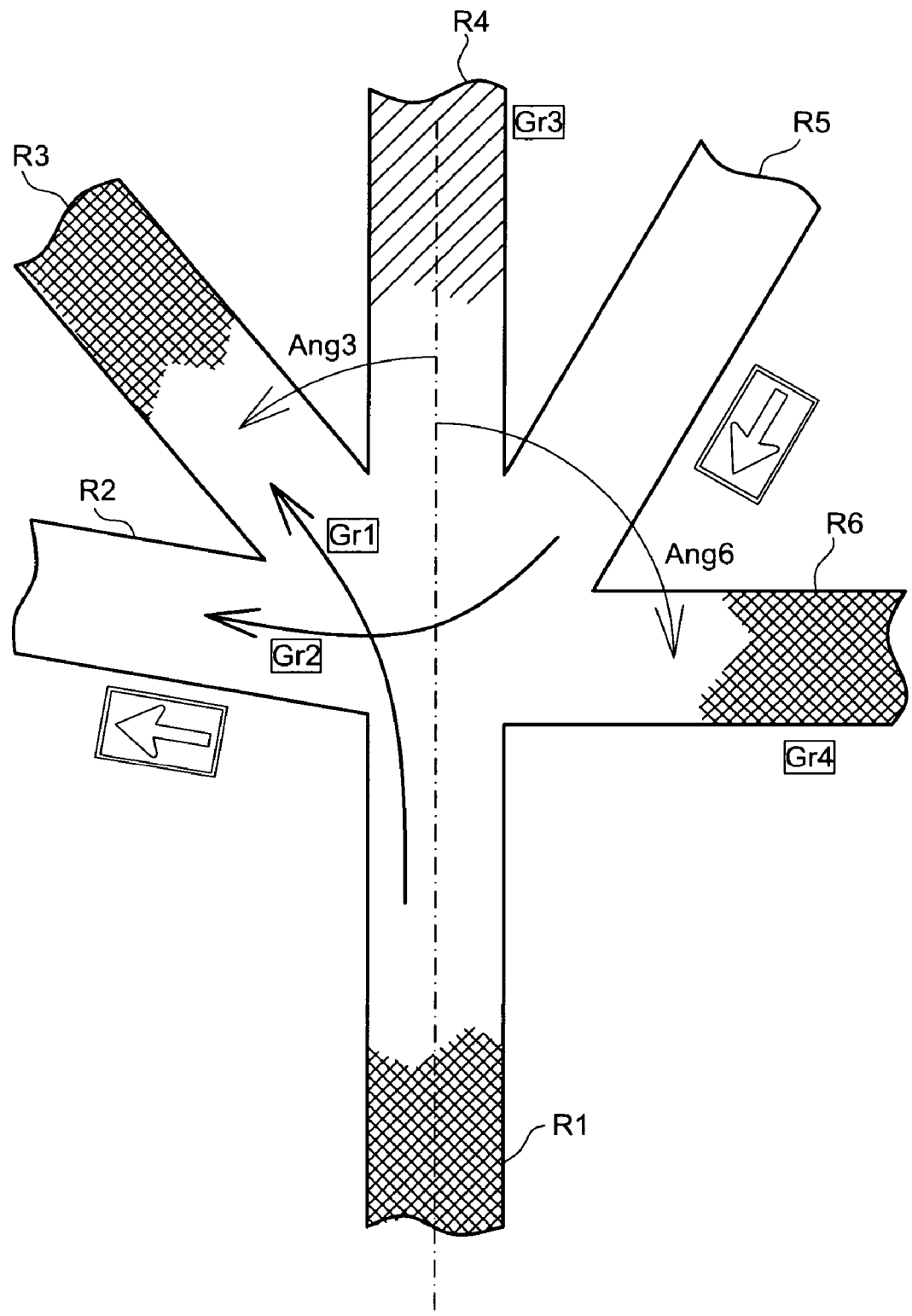
FIG. 4 shows one example of polygon grouping process.

FIG. 4 shows one example of the polygon grouping process. In the illustrated example, six polygons R1 to R6 representing six roads cross at one point of intersection. The partial hatching shows the road classes of the respective polygons R1 to R6. The polygons R1, R3, and R6 represent national highways, the polygon R4 represents a prefectural road, and the polygons R2 and R5 represent local roads. The road represented by the polygon R5 has one-way restriction in a direction toward the intersection, while the road represented by the polygon R2 has one-way restriction in a direction apart from the intersection.

The polygon grouping process correlates multiple polygons representing roads generally regarded as parts of one continuous road. The procedure of this embodiment first sets polygons representing adjacent roads under continuous one-way restriction in one group. In the illustrated example, the polygons R2 and R5 represent the roads under the continuous one-way restriction and are thus set in one group with a label Gr2. The grouping condition is not restricted to such one-way restriction. In another example, polygons having an identical road name, for example, Route X, as an attribute may be set in one group.

Another grouping condition is applied to specify a group for the polygon R1. The polygon R1 does not have the one-way restriction. In this case, the procedure of the embodiment selects polygons representing roads of the same road class for grouping. In the illustrated example, the three polygons R1, R3, and R6 are of the identical road class. Namely the two polygons R3 and R6 are possible options for grouping with the polygon R1. Setting all the three polygons R1, R3, and R6 in one group is possible, but the procedure of this embodiment selects one of the two polygons R3 and R6 for grouping with the polygon R1 to avoid road branching. The road branching complicates the subsequent edge line generation process. In order to avoid the road branching, the procedure of this embodiment selects a polygon having a shallower connection angle to the polygon R1 between the polygons R3 and R6 as an object of grouping with the polygon R1. The connection angle of each polygon relative to the polygon R1 is defined as an angle between the axis of symmetry in the polygon and an extension of the axis of symmetry in the polygon R1 over the intersection. A connection angle Ang3 between the polygons R1 and R3 is shallower than a connection angle Ang6 between the polygons R1 and R6. The polygons R1 and R3 are accordingly set in one group with a label Gr1.

In the illustrated example, the polygons R4 and R6 have no adjacent polygons to be grouped together at this intersection and thus individually form single groups with labels Gr3 and Gr4.

Figure 5:
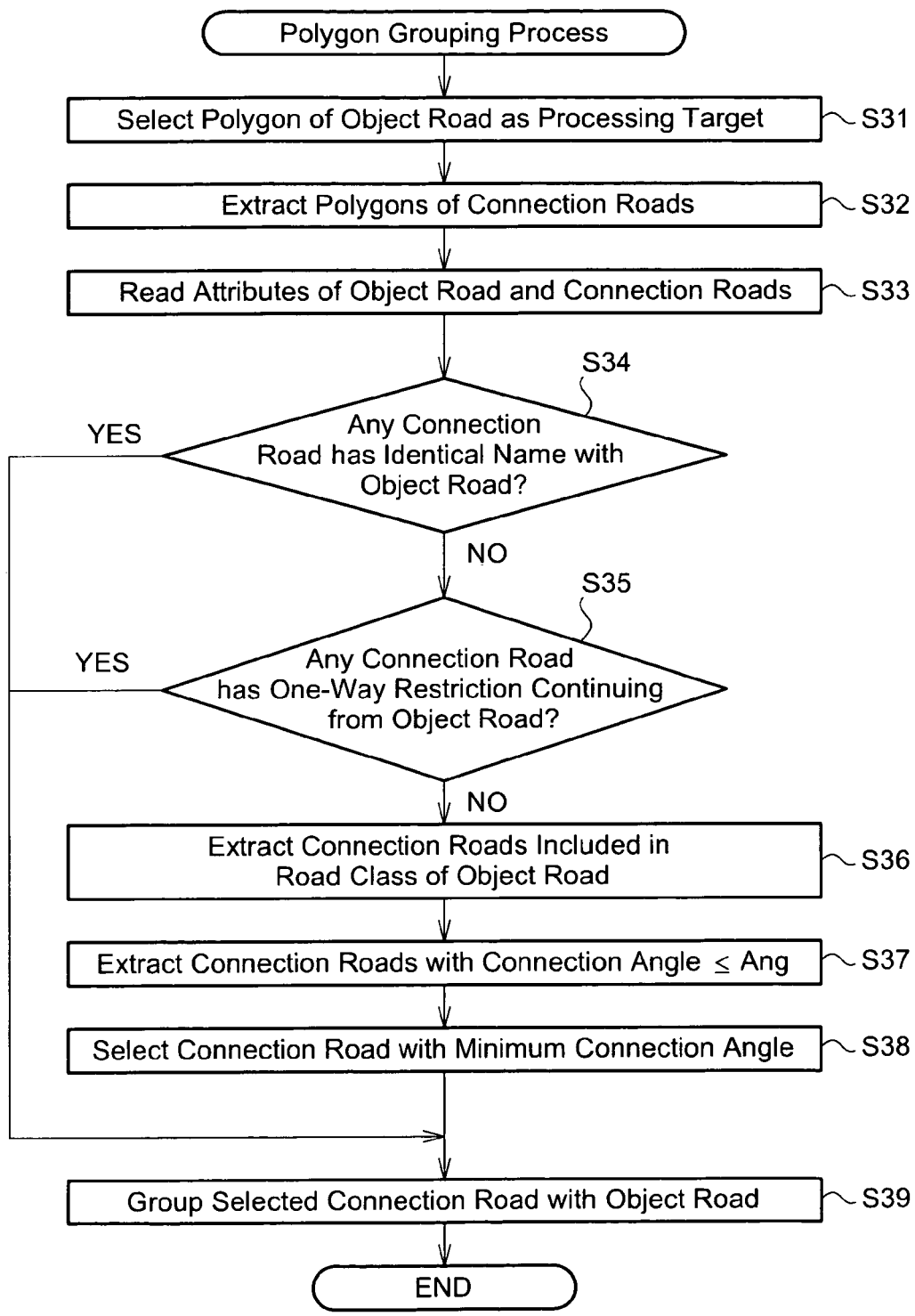
FIG. 5 is a flowchart showing a polygon grouping process.

FIG. 5 is a flowchart showing the details of the polygon grouping process executed at step S30 in the road polygon generation process (see FIG. 2). The polygon grouping shown in FIG. 4 is performed according to this flowchart. The CPU first selects one road as a processing target (hereafter referred to as object road) (step S31) and extracts roads connecting with the object road (hereafter referred to as connection roads) (step S32). In the illustrated example, the polygon R1 is selected as the object road and the polygons R2 to R6 are extracted as the connection roads.

The CPU reads the attributes of the object road and the connection roads (step S33) and retrieves any connection road having the same road name as the object road (step S34). When there is any connection road having the same road name as the object road (step S34), the CPU groups the object road and the connection road having the same road name (step S39). The grouping step may allocate a common label to the respective roads in the group as shown in FIG. 4.

When there is no connection road with the same road name as the object road (step S34), the CPU subsequently retrieves any connection road having continuous one-way restriction from the object road (step S35). When there is any connection road having the continuous one-way restriction, the CPU groups the object road and the connection road having the continuous one-way restriction (step S39).

When there is no connection road with the continuous one-way restriction or when there is no connection road with any one-way restriction (step S35), the CPU subsequently extracts all connection roads in the same road class as the object road as possible options for grouping (step S36) and extracts connection roads having a connection angle of not greater than a preset reference value Ang among the extracted connection roads in the same road class (step S37). The reference value Ang may be set arbitrarily and is set equal to 90 degrees in this embodiment. This setting excludes any connection roads having an acute bent from the object road from the possible options for grouping.

The CPU then selects a connection road with the minimum connection angle from the extracted connection roads as the possible options for grouping (step S38) and groups the object road and the selected connection road with the minimum connection angle (step S39). When the search refinement to step S37 leaves no connection road as the possible option for grouping, the CPU forms a single group including only the object road. The CPU repeats this series of processing until completion of the processing with regard to all roads.

The grouping conditions and their priorities are not restricted to the above processing flow but may be set arbitrarily. For example, the condition of traffic regulation is not limited to the one-way restriction but may be right turn prohibition or left turn prohibition. The condition of connection angle (step S37) may be omitted when not required. The condition of road class (step S36) and the condition of connection angle (step S37) may be arranged in parallel. This modification extracts connection roads satisfying either of the road class condition and the connection angle condition as possible options for grouping.

Figure 6:
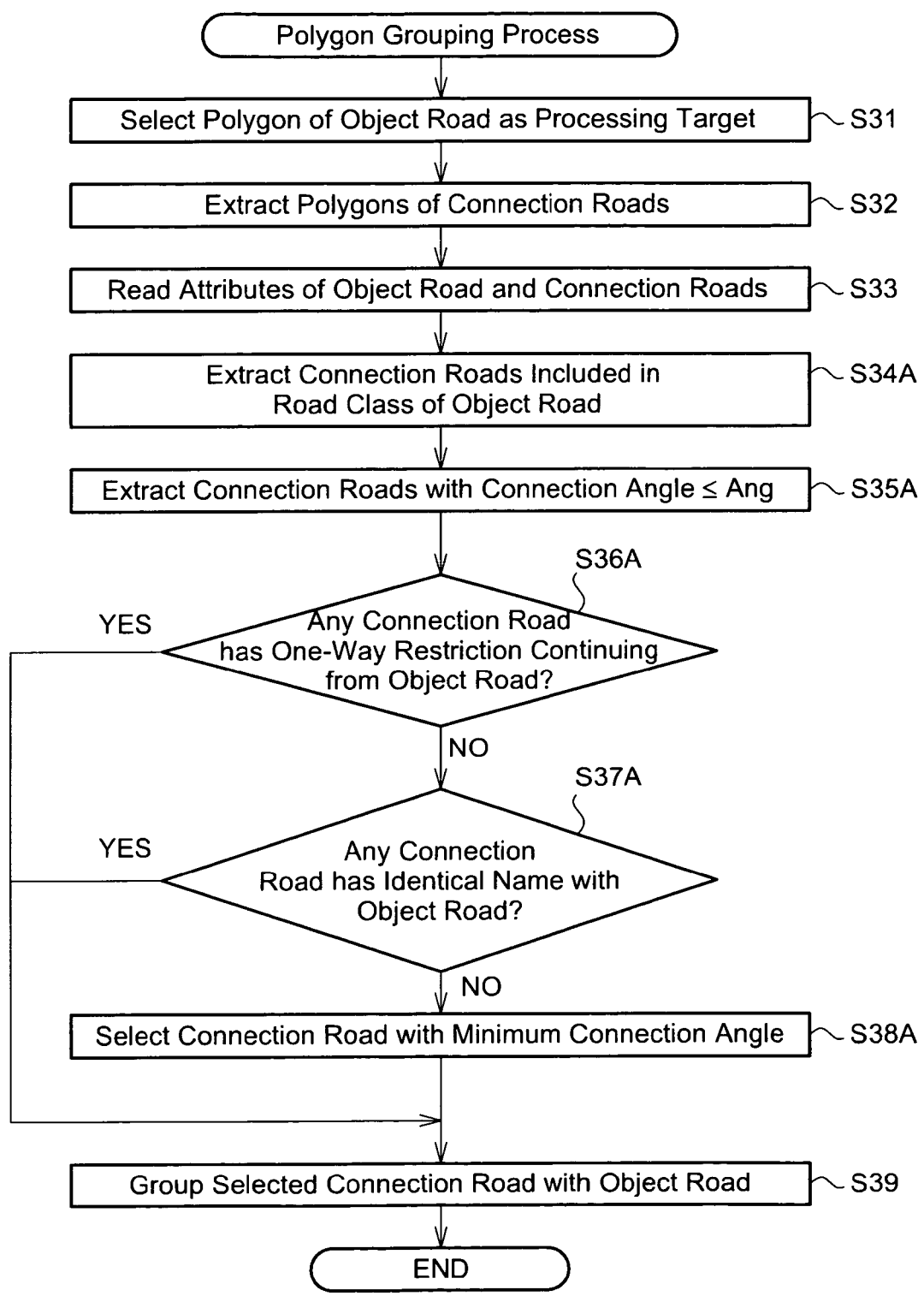
FIG. 6 is a flowchart showing a modified polygon grouping process.

FIG. 6 is a flowchart showing a modified polygon grouping process. The primary difference from the polygon grouping process of the embodiment (FIG. 5) is the priorities of the grouping conditions. The CPU first selects one road as a processing target (hereafter referred to as object road) (step S31) and extracts roads connecting with the object road (hereafter referred to as connection roads) (step S32).

The CPU reads the attributes of the object road and the connection roads (step S33), extracts all connection roads in the same road class as the object road (step S34A), and extracts connection roads having a connection angle of not greater than a preset reference value Ang, that is, connection roads connecting the object road at shallow angles (step S35A).

The CPU subsequently retrieves any connection road having continuous one-way restriction from the object road among the extracted connection roads in the same road class with the shallow connection angle (step S36A). When there is any connection road having the continuous one-way restriction, the CPU groups the object road and the connection road having the continuous one-way restriction (step S39). When there is no connection road with the continuous one-way restriction or when there is no connection road with any one-way restriction (step S36A), the CPU retrieves any connection road having the same road name as the object road among the extracted connection roads in the same road class with the shallow connection angle (step S37A).

When there is any connection road having the same road name as the object road, the CPU groups the object road and the connection road having the same road name (step S39). When there is no connection road having the same road name as the object road, the CPU selects a connection road with the minimum connection angle among the extracted connection roads in the same road class with the shallow connection angle (step S38A) and groups the object road and the selected connection road with the minimum connection angle (step S39). The reference value Ang may be set arbitrarily and is set equal to 90 degrees in this embodiment. This setting excludes any connection roads having an acute bent from the object road from the possible options for grouping. The CPU repeats this series of processing until completion of the processing with regard to all roads.

The modified polygon grouping process is effective when the road name alone is not sufficient for grouping without road branching, for example, when one road may be branched off to multiple roads under the same road name. The polygon grouping process is not restricted to the processing flow of the embodiment or the processing flow of the modified example but may be modified with other grouping conditions and their priorities.

E. Polygon Terminal Processing

The polygon terminal processing adjusts the terminal geometry of each polygon according to the connection status of adjacent polygons for the enhanced appearance of a resulting map. The procedure of this embodiment selectively uses multiple different terminal processing techniques for polygon terminal processing. The description regards the available terminal processing techniques with reference to FIGS. 7 through 10, the concrete processing methods according to the various road connection statuses with reference to FIGS. 11 through 15, and the general processing flow of the polygon terminal processing with reference to the flowchart of FIG. 16.

E1. Processing Techniques

This embodiment adopts four different terminal processing techniques, that is, a connection process, a fillet process, a polygon convex process, and an M-shape process for adjustment of the terminal geometry of each polygon, in addition to generation of a simple rectangular polygon by expansion of a link. These four terminal processing techniques are described sequentially.

(1) Connection Process

Figure 7:
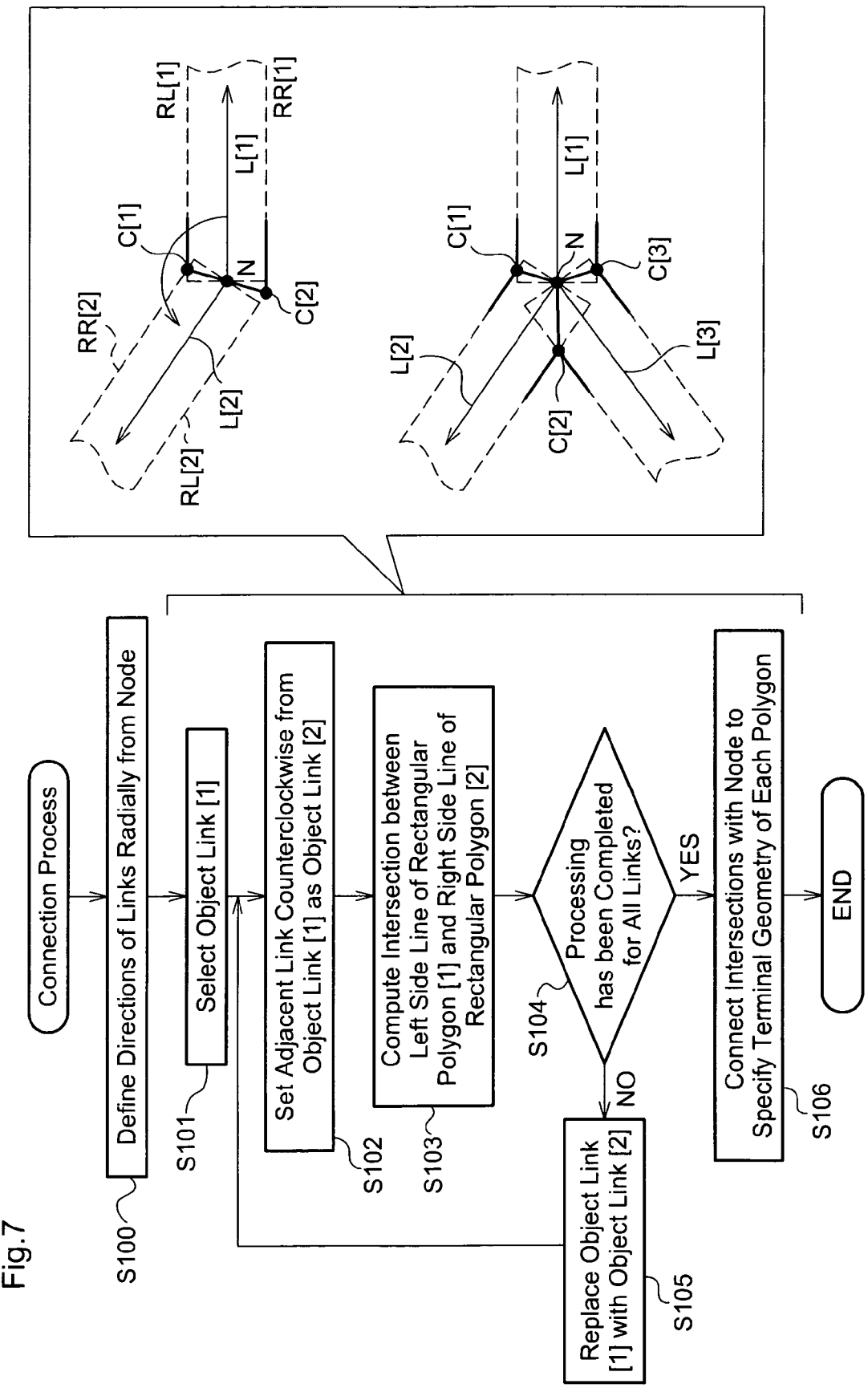
FIG. 7 is a flowchart showing a connection process.

FIG. 7 is a flowchart showing the connection process. In the connection process, the CPU first defines directions of respective links radial from a node as an intersection of links to be processed (step S100). The link data is given as point sequence data representing a sequence of points. The processing of step S100 arranges the point sequence data from the node as a starting point, as preparation for defining the positional relation between links. The processing of step S100 may be omitted when a different technique is applied to define the positional relation between links.

The CPU then selects one of the multiple links intersecting at the node as an object link [1] as a processing target (step S101) and retrieves and selects an adjacent link counterclockwise from the object link [1] as an object link [2] (step S102). The direction of the retrieval is not restricted to counterclockwise but may be clockwise.

Processing examples are given in the right half of FIG. 7. The upper drawing shows two roads intersecting at a node N, and the lower drawing shows three roads intersecting at the node N. In the upper illustrated example, two links L[1] and L[2] intersect at the node N and the link L[1] is selected as the object link [1]. The counterclockwise retrieval (in the direction of the arrow) selects the link L[2] as the object link [2].

After selection of the object links [1] and [2], the CPU computes a cross point between a left side line of a rectangular polygon [1] and a right side line of a rectangular polygon [2] (step S103). The left side and the right side are determined on the basis of the radial directions of the links defined at step S100. The rectangular polygons [1] and [2] are obtained by expansion of the object links [1] and [2]. At this stage, the format of polygon data is not required. The only requirement for the rectangular polygons [1] and [2] is definition of left and side lines parallel to the object links [1] and [2].

In the upper illustrated example, a left side line RL[1] and a right side line RR[1] are defined as parallel lines to the link L[1], and a left side line RL[2] and a right side line RR[2] are defined as parallel lines to the link L[2]. The processing of step S103 computes a cross point C[1] of the left side line RL[1] and the right side line RR[2].

The CPU repeats this series of processing with replacement of the object link [2] with the object link [1] (step S105) until completion of the processing with regard to all links (step S104). In the upper illustrated example, on completion of the processing with the link L[1] as the object link [1], the same series of processing is repeated for the link L[2] set as a new object link [1]. In this cycle, the CPU selects the link L[1] as a new object link [2] and computes a cross point C[2] of the left side line RL[2] and the right side line RR[1].

On completion of the processing with regard to all the links, the CPU generates a polygon with the specified cross points and the node as apexes (step S106). In the upper illustrated example, the terminal geometry of a polygon corresponding to the link L[1] is defined by a connecting line of the cross point C[1], the node N, and the cross point C[2] as shown by the thick solid line.

The connection process is similarly performed at an intersection of three or more links. Three links L[1] to L[3] cross at an intersection in the lower example of FIG. 7. When the link L[1] is selected as the object link [1], the connection process selects the link L[2] as the object link [2] and specifies a cross point C[1]. The connection process sequentially changes the object link [1] to the link L[2] and to the link L[3] and specifies cross points C[2] and C[3]. This defines the terminal geometries of the respective polygons corresponding to the links L[1] to L[3] as shown by the thick solid lines.

(2) Fillet Process

Figure 8:
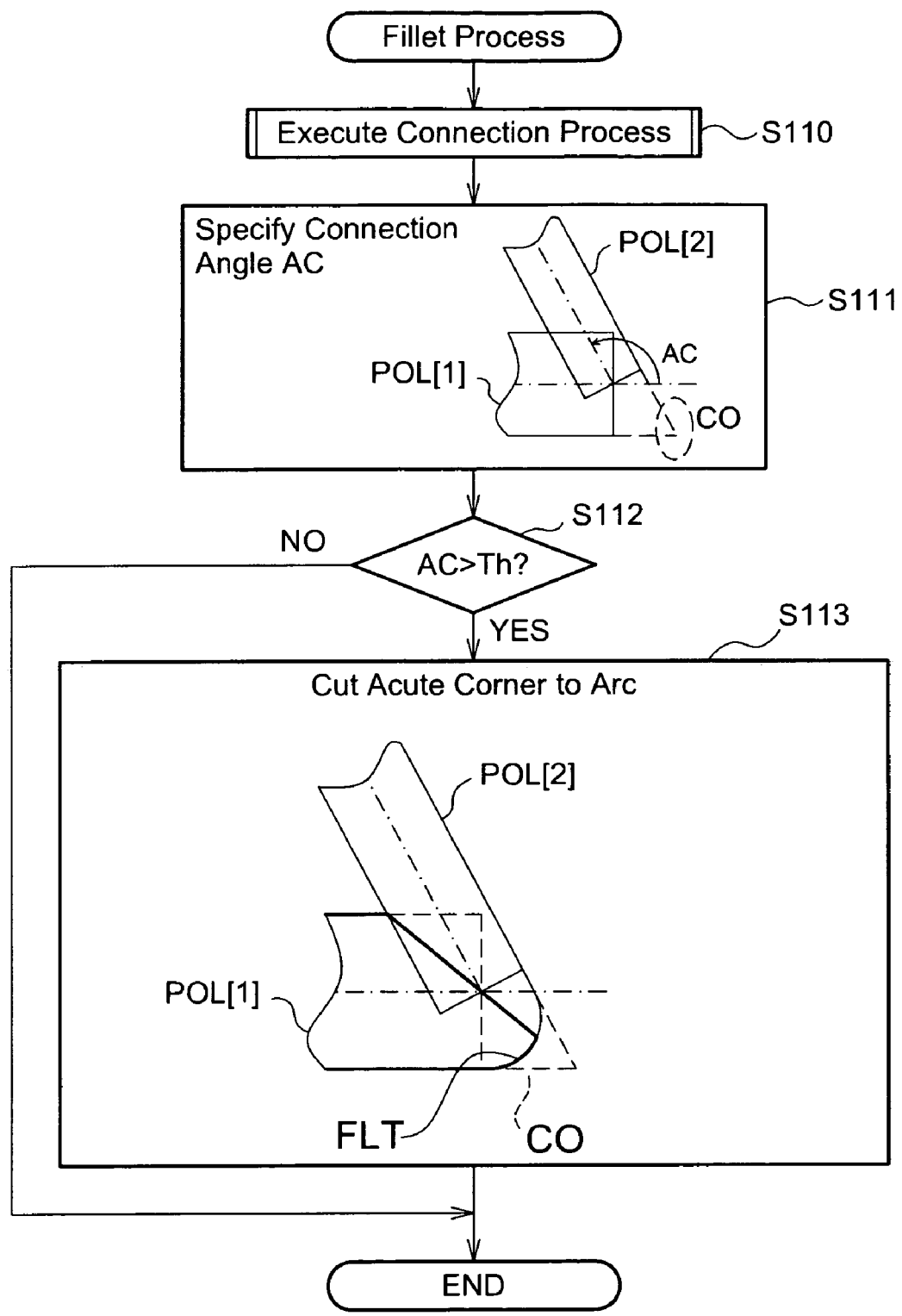
FIG. 8 is a flowchart showing a fillet process.

FIG. 8 is a flowchart showing the fillet process, which is executed as the post-processing subsequent to the connection process (step S110). The CPU computes a connection angle AC between two links as processing objects (step S111). In this embodiment, the connection angle AC corresponds to an angle of a turn from one link to the other link. The connection process generates two polygons POL[1] and POL[2] from the two links in the illustrated example. The greater connection angle AC gives an acuter corner CO at the connection of the polygon POL[1] with the polygon POL[2].

The fillet process is applied only to the case where the connection angle AC is greater than a preset threshold value Th (step S112). The threshold value Th is set to, for example, 90 degrees, although this value is varied arbitrarily. When the connection angle AC is greater than the preset threshold value Th, the CPU cuts the acute corner CO to form an arc FLT (step S113). The radius of the arc FLT may be set to a fixed value or may be determined by multiplying the width of the polygon by a predetermined factor.

(3) Polygon Convex Process

Figure 9:
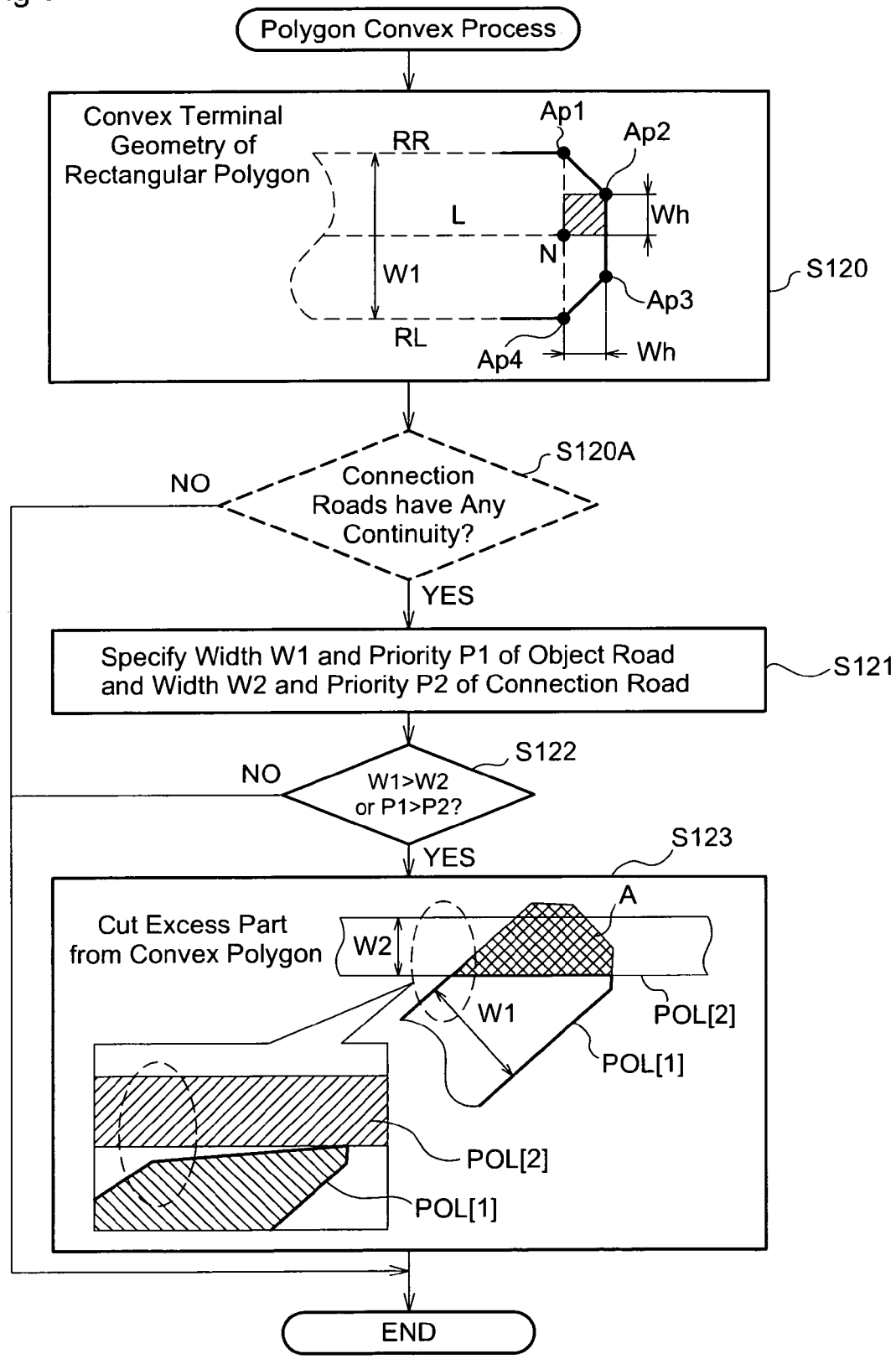
FIG. 9 is a flowchart showing a polygon convex process.

FIG. 9 is a flowchart showing the polygon convex process. The CPU first convexes the terminal geometry of a rectangular polygon corresponding to an object road specified as a processing target (step S120). The concrete procedure of convexing the terminal geometry connects the side lines of the object polygon by a polygonal line to have a convex. The polygonal line defines a convex terminal geometry without protrusion of any diagonal line. The procedure of this embodiment adjusts the terminal geometry of the object polygon to an isosceles trapezoid.

One example of the convex terminal geometry is shown in the box of step S120. In this example, side lines RR and RL of a rectangular polygon are defined about a link L having an end point at a node N. The CPU shifts the node N by a length Wh in the direction parallel to the link L and by the length Wh in the direction perpendicular to the link L to define a point Ap2. This process is equivalent to the process of drawing a phantom Wh-square that has the node N as one apex and has one side parallel to the link L and specifying the apex at the opposing corner to the node N as the point Ap2. Another point Ap3 symmetrical to the point Ap2 along the link L is specified in the similar manner. The terminal shape of the polygon is defined by a polygonal line connecting an end point Ap1 of the side line RR, these specified points Ap2 and Ap3, and an end point Ap4 of the side line RL.

The length Wh required for this terminal convexing process may be set arbitrarily. In this embodiment, the length Wh is set equal to a half width of a road in a lower road class than the road class of the object road by at least two stages. In this embodiment, the roads are classified into the road classes of express way, national highway, prefectural road, and local road. For example, when the object road is a national highway, the length Wh is a half width of a prefectural road. The length Wh may be determined by multiplying half a width W1 of the object road by a predetermined factor. A subsequent step S120A is executed in a modified flow of the polygon convex process and is omitted in the processing flow of this embodiment.

The CPU subsequently specifies a width W1 and a priority P1 of the object road and a width W2 and a priority P2 of a connection road crossing the object road (step S121). When the width W1 is greater than the width W2 or when the priority P1 is higher than the priority P2 (step S122), the CPU eliminates an extra or unnecessary part from the convex terminal geometry (step S123). The priorities of the roads are set in the specification table (see FIG. 1). In this embodiment, for example, the priority of 'national highway' is set higher than the priority of 'prefectural road'. When the object road is 'national highway' and the connection road is 'prefectural road', the processing of step S123 is executed irrespective of their width relation. Even when the object road has the lower priority, for example, when the object road is 'prefectural road' and the connection road is 'national highway', the processing of step S123 is executed under the condition that the width W1 of the object road is greater than the width W2 of the connection road.

One processing example is shown in the box of step S123. In this illustrated example, a polygon POL[1] of a width W1 has been subjected to the polygon convex process. The width W1 of the polygon POL[1] is greater than a width W2 of a polygon POL[2] crossing the polygon POL[1]. Under such conditions, the polygon POL[1] may be protruded from the polygon POL[2] as illustrated. A hatched area A is thus eliminated from the convex terminal geometry of the polygon POL[1].

The rounding error of the operation in the extra part elimination step may cause a gap between the polygon POL[1] and the polygon POL[2] as shown by a broken eclipse. Such a gap is very narrow and inconspicuous and is accordingly left without any further processing in this embodiment. One point corresponding to the apex of the polygon POL[1] may be added on the side line of the polygon POL[2] for elimination of this gap.

When the width W1 of the polygon POL[1] of the object road is not greater than the width W2 of the polygon POL[2] of the connection road, the polygon concave process of this embodiment skips the extra part elimination step. This is because there is a low possibility that the polygon POL[1] is protruded from the polygon POL[2] in this condition and the extra part elimination may give a gap as described above. The skip of the extra part elimination step is, however, not essential. The extra part elimination step (step S123) may be executed, regardless of the width relation between the polygons POL[1] and POL[2].

The polygon convex process may adjust the terminal geometry to an arc shape, instead of the isosceles trapezoid. For example, the terminal geometry of the object road PP may be adjusted to a semicircle across the both ends of the object road PP.

(4) M-Shape Process

Figure 10:
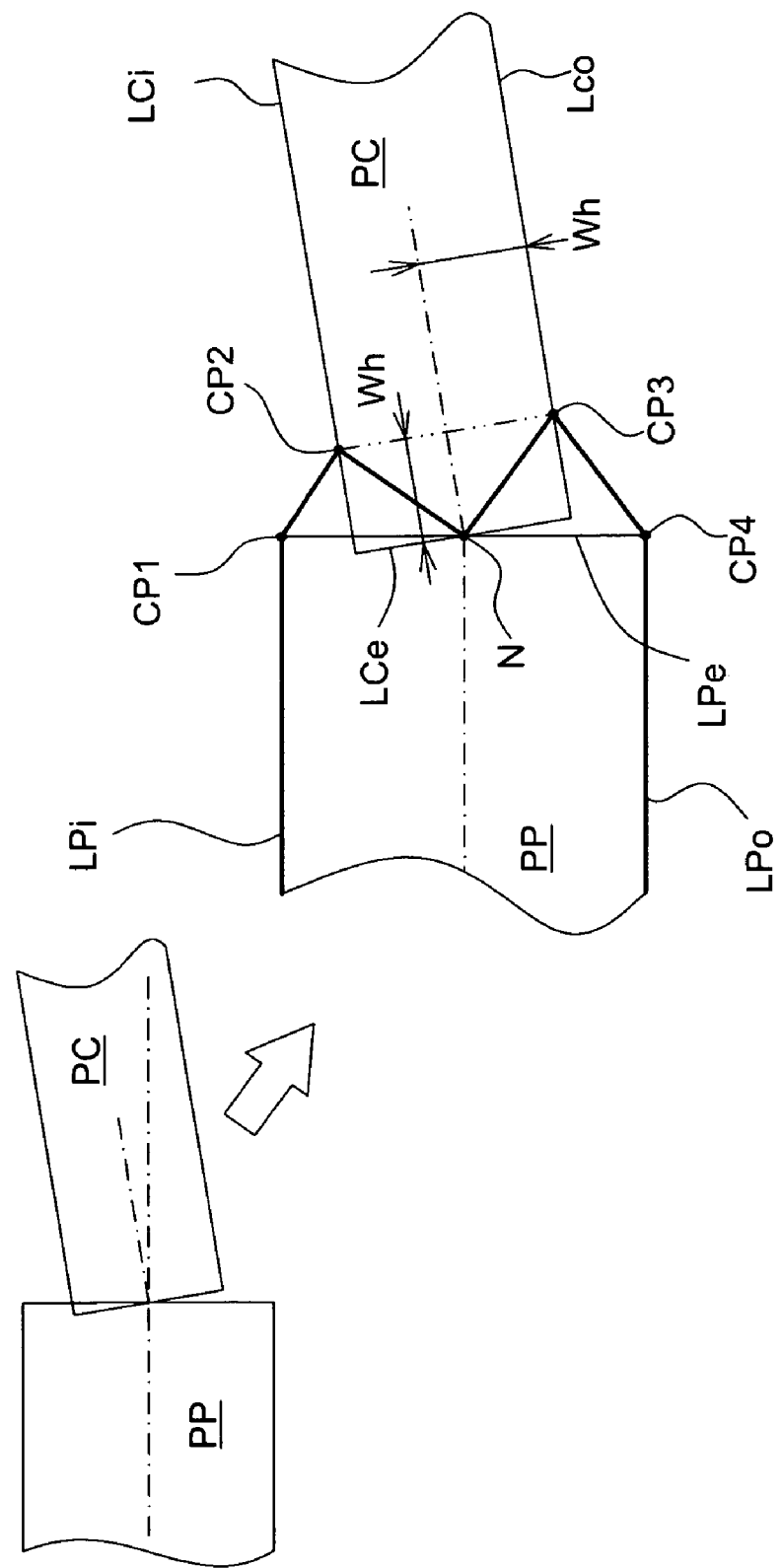
FIG. 10 shows one example of M-shape process.

FIG. 10 shows one example of the M-shape process. The M-shape process adjusts the terminal geometry of an object road PP to an M-letter shape formed by points CP1, CP2, N, CP3, and CP4. The points CP1 and CP4 are apexes on the rectangular terminal geometry of the object road PP. The point N is a node at the point of an intersection of the object road PP and a connection road PC. The points CP2 and CP3 are cross points of side lines LCi and LCo of the connection road PC with a parallel line segment translated from an edge line LCe of the connection road by a distance Wh. The distance Wh is half the width of the connection road PC. The specification of the points CP2 and CP3 used for the M-shape process is not restricted to this illustrated method but may be modified arbitrarily.

E2. Processing when all Connection Roads are Included in Road Class of Object Road The selective use of the respective terminal processing techniques is described below with an example of adjusting the terminal geometries of two roads selected among multiple roads intersecting at an intersection. FIG. 11 shows a terminal processing method (1), which is applied under the condition that all connection roads are in the same road class as an object road. Four examples are given corresponding to the respective conditions of the road width and the connection angle for the selective use of the terminal processing techniques: i) the connection road has the same width as the width of the object road and is connected to the object road at a connection angle of not greater than 90 degrees; ii) the connection road has the smaller width than the width of the object road and is connected to the object road at a connection angle of greater than 30 degrees but not greater than 90 degrees; iii) the connection road has the smaller width than the width of the object road and is connected to the object road at a connection angle of not greater than 30 degrees; and iv) the connection road is connected to the object road at a connection angle of greater than 90 degrees. Under the condition of FIG. 11, the polygon terminal processing selectively executes the connection process, the M-shape process, and the fillet process.

The top-most field shows one example of the first case where a connection road has the same width as the width of an object road. In this example, a connection road PC is connected to an object road PP at a connection angle AC of not greater than 90 degrees. Before the polygon terminal processing, polygons of the object road PP and the connection road PC have rectangular terminal geometries as shown in the left drawing.

The connection process (see FIG. 7) is performed in this case. The connection process first specifies cross points CPi and CPo between side lines LPi and LPo of the object road PP and side lines LCi and LCo of the connection road PC and then connects the specified cross points CPi and CPo via a node to adjust the terminal geometry of the object road PP. For the convenience of explanation, the illustrated process provisionally generates a rectangular polygon as the object road PP and then performs the connection process to adjust the terminal geometry of the object road PP. The processing flow may, however, be modified to specify the side lines LPi and LPo and the cross points CPi and CPo from the respective links and specifies the terminal geometry of the object road PP without generation of a provisional rectangular polygon. Such modification is applicable to any of the polygon terminal processing described below.

The second-top field shows one example of the second case where a connection road has a different width from the width of an object road and is connected to the object road at a connection angle of greater than 30 degrees but not greater than 90 degrees. In this example, a connection road PC has the smaller width than the width of an object road PP. The connection process specifies cross points CPi and CPo at the positions of an extended side line LPi and a shortened side line LPo as shown by the right drawing.

In the connection process, the shallower connection angle results in the farther position of the cross point CPi from the unprocessed edge of the object road PP. The object road PP having the shallow connection angle may accordingly have an irregular terminal geometry. In order to avoid the irregular terminal geometry, the polygon terminal processing of this embodiment performs the M-shape process as modification of the connection process when the connection angle is not greater than 30 degrees. The third-top field shows one example of the M-shape process. In this example, a connection road PC has the smaller width than the width of an object road PP and is connected to the object road at a connection angle of not greater than 30 degrees. The connection angle as the criterion for application of the M-shape process is not restricted to 30 degrees but may be set arbitrarily.

The bottom field shows one example of the fourth case where a connection road has a different width from the width of an object road and is connected to the object road at a connection angle of greater than 90 degrees. In this case, the connection process appropriately shortens and extends the side lines of the object road and the connection road to specify the cross points and adjusts the terminal geometry of the object road. At the connection angle of greater than 90 degrees, the cross points of the side lines form an acute corner CO. The procedure of this embodiment adjusts the acute corner CO by the fillet process to improve the corner appearance. The fillet process is performed to adjust the acute corner CO of less than 90 degrees to an arc FLT. The angle as the criterion for application of the fillet process is not restricted to 90 degrees but may be set arbitrarily. Such corner adjustment to the arc FLT may be omitted when not required.

The procedure of this embodiment applies the M-shape process when the connection road has the smaller width than the width of the object road and is connected to the object road at the connection angle of not greater than 30 degrees. In this case, the connection road PC in the third-top field of FIG. 11 is subjected to the connection process shown in the top-most field. This is because the object road PP in the third-top field has the greater width than the connection road PC as the processing target. The terminal geometry of the connection road PC accordingly does not fit the terminal geometry of the object road PP. This inconsistency is, however, not observable by appropriately regulating the drawing order. The object road PP with the terminal geometry adjusted by the M-shape process is drawn after the connection road PC with the terminal geometry adjusted by the connection process. The object road PP then covers over the terminal geometry of the connection road to eliminate the awkwardness in display of map drawing.

One possible modification of the embodiment may modify the conditions for the selective use of the terminal processing techniques to ensure the consistency of the terminal geometries of the object road and the connection road. The top-most case of FIG. 11 is restricted to the condition that the connection road has the 'same' width as the width of the object road. The second-top case is applied to the conditions that the connection road has a different (greater or smaller) width from the width of the object road and is connected to the connection angle of greater than 30 degrees and not greater than 90 degrees. When the connection road has the greater width than the width of the object road and is connected to the object road at the connection angle of not greater than 30 degrees, the terminal geometry of the object road is adjusted to a pointed shape of the connection road PC in the third-top field of FIG. 11 (pencil edge processing). Cross points CP2 and CP3 for defining the pointed shape of the pencil edge processing are obtained in the same manner as the M-shape process. Application of this pencil edge processing effectively eliminates the awkward display at the connection between the object road and the connection road, irrespective of their drawing order.

E3. Processing when Some Connection Roads are Included in Road Class of Object Road FIG. 12 shows a terminal processing method (2), which is applied under the condition that connection roads are the mixture in the same road class as and in a different road class from the object road. Namely the object road has two or more connection roads in this application.

Four examples similar to those of FIG. 11 are given in this application. The top-most field shows one example of the first case where the connection road has the same width as the width of the object road and is connected to the object road at a connection angle of not greater than 90 degrees. The second-top field shows one example of the second case where the connection road has the smaller width than the width of the object road and is connected to the object road at a connection angle of greater than 30 degrees but not greater than 90 degrees. The third-top field shows one example of the third case where the connection road has the smaller width than the width of the object road and is connected to the object road at a connection angle of not greater than 30 degrees. In these three cases, the connection process and the M-shape process are selectively performed in the same manner as explained above with the examples of FIG. 11.

The bottom field shows one example of the fourth case where the connection road is connected to the object road at a connection angle of greater than 90 degrees. In this case, the polygon terminal processing of this embodiment selects the polygon convex process to adjust the terminal geometry of the object road. The polygon convex process defines a phantom square SQ (filled with hatched lines), which starts from a cross point (node) between the link of the object road PP and the link of the connection road PC in a link-extending direction and has one side located on an end line LPe of the object road PP. An apex CP2 of the phantom square SQ at the opposing corner to the node is then specified.

Figure 13:
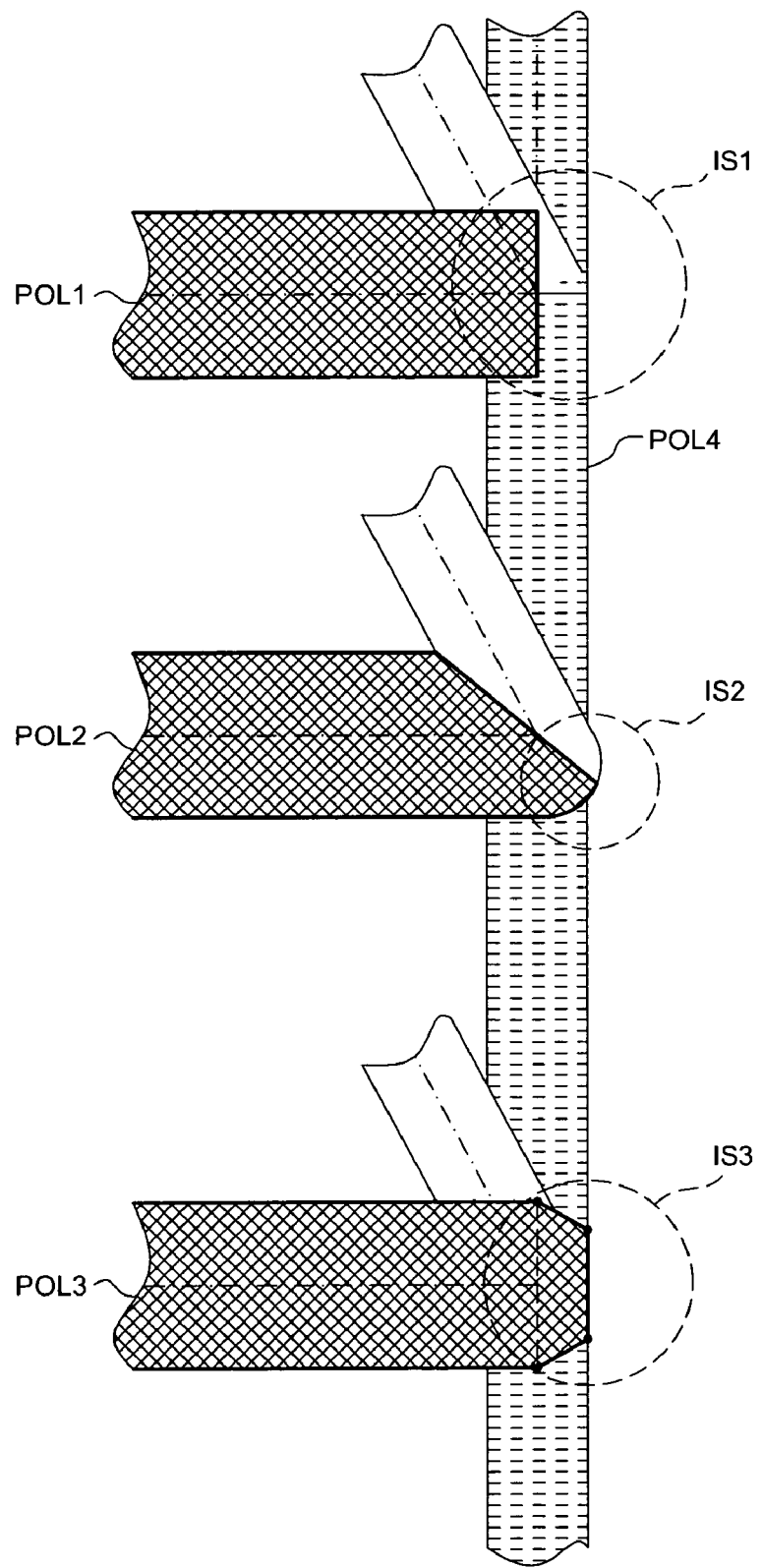
FIG. 13 shows the effects of the polygon convex process.

FIG. 13 shows the effects of the polygon convex process. Object roads POLL to POL3 have terminal geometries adjusted by three different techniques. In this illustrated example, the object roads POLL to POL3 further cross a road POL4 of the narrower width at the intersections with the respective connection roads.

The object road POL1 has the rectangular terminal geometry, which is not protruded from the road POL4. The color coding or pattern coding at the intersection is rather awkward among the object road POL1, the connection road, and the road POL4 as shown in an area IS1.

The object road POL2 has the terminal geometry adjusted by the combination of the connection process and the fillet process (see the bottom field in FIG. 11). The terminal geometry of the object road POL2 adjusted by the fillet process may be protruded from the road POL4 as shown in an area IS2. This gives the awkward and unpractical display in map drawing.

The object road POL3 has the terminal geometry adjusted by the polygon convex process. The polygon convex process gives the natural terminal geometry of the object road POL3, which is not protruded from the road POL4 as shown in an area IS3. The non-protrusion is ascribed to the fact that the length of extension of the object road POL3 (that is, the length of each side of the phantom square SQ in FIG. 12) in the polygon convex process is restricted to the half width of the road in the lower road class as described previously. The polygon convex press of this embodiment effectively adjusts the terminal geometry of the object road without any protrusion from the crossing road.

E4. Processing when No Connection Road is Included in Road Class of Object Road

FIG. 14 shows a terminal processing method (3), which is applied under the condition that no connection road is in the same road class as the object road. This application is divided into two cases where some of connection roads are in an identical road class and where all connection roads are in different road classes.

Four examples are given in this application. The top-most field shows one example of the first case where a connection road PC has a wider width Wpc than a width Wpp of an object road PP. In this case, the rectangular terminal geometry of the object road PP is left without any adjustment process, because of the reason described later.

The second-top field shows one example of the second case where the connection road has the same width as the width of the object road and is connected to the object road at a connection angle of not greater than 90 degrees. In this case, the connection process is performed in the similar manner to FIG. 11 to connect the cross points of side lines of the object road and the connection road to adjust the terminal geometry of the object road.

The third-top field shows one example of the third case where the connection road has the smaller width than the width of the object road and is connected to the object road at a connection angle of not greater than 90 degrees. In this case, the polygon convex process is performed. The concrete procedure of the polygon convex process has been described previously with reference to FIG. 10. The length of each side of the phantom square SQ in the polygon convex process may be set to a half width Wh of the connection road PC.

The bottom field shows one example of the fourth case where the connection road has the same width as or the smaller width than the width of the object road and is connected to the object road at a connection angle of greater than 90 degrees. In this case, the polygon convex process described previously with reference to FIG. 10 is performed to adjust the terminal geometry of the object road PP.

As described above, the procedure of this embodiment does not adjust the terminal geometry of the object road when the connection road has the greater width than the width of the object road. The connection road in this case satisfies either the condition of the third case or the condition of the fourth case and is thus subjected to the polygon convex process for adjustment of the terminal geometry. The connection road with the terminal geometry adjusted by the polygon convex process is drawn after the object road. The connection road then covers over the terminal geometry of the object road to eliminate the awkwardness in display of map drawing. This is the reason of non-adjustment of the terminal geometry of the object road under the condition that the connection road has the greater width than the width of the object road. One possible modification may adjust the terminal geometry of the object road even in this condition to fit the terminal geometry of the connection road adjusted by the polygon convex process. Such adjustment of the terminal geometry effectively eliminates the awkward display at the connection between the object road and the connection road, irrespective of their drawing order.

E5. List of Conditions for Selection of Polygon Terminal Processing Techniques and Flowchart of Polygon Terminal Processing FIG. 15 shows a list of the terminal processing techniques with the conditions for selection shown in FIGS. 11 through 14. The left-most column 'road class' shows the relation between the road classes of the object road and the connection roads. The next column shows the rule for selecting a connection road to be processed. When there are multiple connection roads connecting with an object road, the procedure of this embodiment selects one of the multiple connection roads and specifies the terminal geometry of the object road according to the terminal processing technique selected based on the relation between the object road and the selected connection road. The connection road to be processed is selected according to the preset rule. The next column 'connection status' shows the conditions for the selective use of the terminal processing techniques to specify the terminal geometry of the object road. The conditions are specified by the widths of the object road and the connection road and the connection angle between the object road and the connection road.

In Cases 1 to 3, all the connection roads are in the same road class as the object road (see FIG. 11). In these cases, the polygon terminal processing selects a connection road grouped with the object road or a connection road having a minimum connection angle among the connection roads and uses the selected connection road for adjustment of the terminal geometry of the object road. In Cases 1 to 3, the terminal geometry of the object road is adjusted by one of the 'connection process', the 'M-shape process', and the combination of 'connection process and fillet process' selected according to the conditions specified in the table of FIG. 15.

In Cases 4 to 6, some of the connection roads are in the same road class as the object road but there is at least one connection road in a different road class (see FIG. 12). In these cases, the polygon terminal processing selects a connection road having a minimum connection angle or a connection road grouped with the object road among connection roads in the same road class as the object road and uses the selected connection road for adjustment of the terminal geometry of the object road. In Cases 4 to 6, the terminal geometry of the object road is adjusted by one of the 'connection process', the 'M-shape process', and the 'polygon convex process' selected according to the conditions specified in the table of FIG. 15.

In Cases 7 to 10, there is no connection road in the same road class as the object road (see FIG. 14). Some of the connection roads may be included in an identical road class, or all of the connection roads may be in different road classes. In these cases, the polygon terminal processing selects a connection road having a minimum connection angle among the connection roads in different road classes. In Cases 7 to 10, one of 'no processing', 'connection process', and the 'polygon convex process' is selected according to the conditions specified in the table of FIG. 15. The option 'no processing' means no adjustment of the terminal geometry of the object road to leave the rectangular geometry of the object road.

Figure 16:
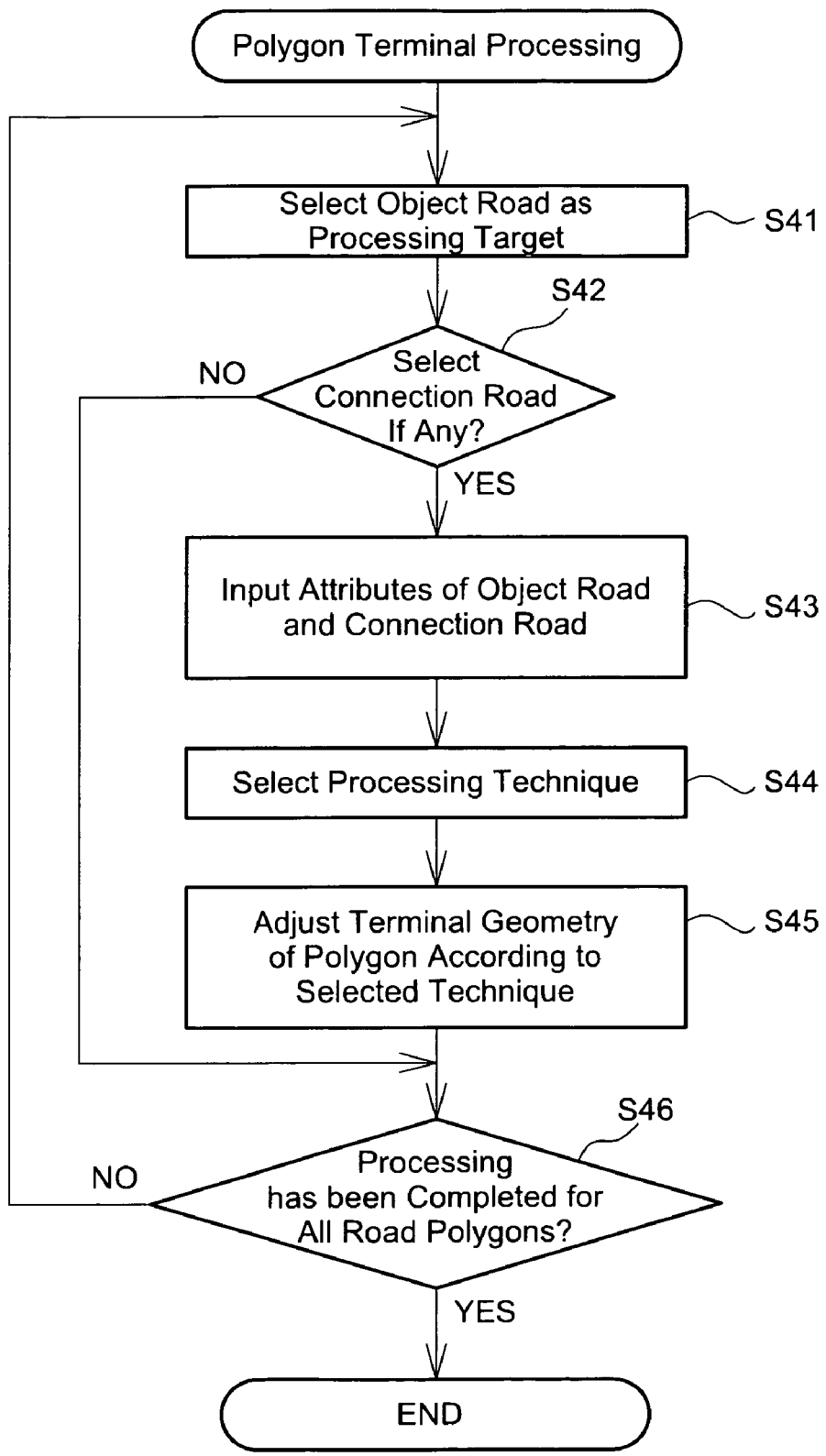
FIG. 16 is a flowchart showing a flow of polygon terminal processing.

FIG. 16 is a flowchart showing the details of the polygon terminal processing executed at step S40 in the road polygon generation process (see FIG. 2). The polygon terminal processing adjusts the terminal geometry of each polygon according to the selective use of the terminal processing techniques shown in FIG. 15.

In the polygon terminal processing the CPU first selects a road polygon as an object road to be processed (step S41) and selects a connection road relative to the object road. When there is no connection road (step S42), the processing flow goes through step S46 back to step S41 to select another road polygon as an object road.

When there is a connection road (step S42), the CPU inputs the attributes of the object road and the connection road (step S43). The input attributes are required information for the selective use of the terminal processing techniques and include at least one of the road class, the road width, and the number of lanes on the road. The CPU refers to the input attributes, selects one of the terminal processing techniques according to the conditions shown in the table of FIG. 15 (step S44), and specifies the terminal geometry of the object road by the selected terminal processing technique (step S45). The connection angle required for selection of the terminal processing technique is computed from an angle between the links of the object road and the connection road. The CPU repeats this series of polygon terminal processing until completion of the processing with regard to all road polygons (step S46).

E6. Selection of Polygon Terminal Processing Techniques (Modified Example)

The selective use of the terminal processing techniques is not restricted to the embodiment described above with reference to FIGS. 11 through 16. FIG. 17 shows the selective use of the terminal processing techniques in one modified example. The procedure of the embodiment selects one of multiple connection roads intersecting an object road at an intersection and uses the selected connection road for adjustment of the terminal geometry of the object road. The procedure of the modified example executes the polygon terminal processing to adjust the terminal geometry of an object road at a connection of three or more roads.

The modified example executes the polygon terminal processing in nine different cases. In Case 1, the object road has no connection road. In this case, non-execution of the polygon terminal processing leaves the rectangular terminal geometry of the object road.

In Case 2, multiple roads intersecting at an intersection are all in an identical road class. In this case, the connection process is performed for all the multiple roads at the intersection. One example of this case is shown in the lower right drawing of FIG. 7 where three roads intersect at an intersection.

In Case 3, multiple connection roads at an intersection are the mixture of those in the same road class as and those in a different road class from the object road, and the object road has the continuity with some of the connection roads. In this case, the connection process is performed for the object road and all the connection roads in the same road class as the object road.

The drawing under the table of FIG. 17 shows specification of the continuity or non-continuity of roads. The continuity or non-continuity of roads is determined according to the angle of links. In the left drawing, links L1 to L3 intersect at a node at angles A12, A23, and A31. The procedure of the modified example defines the 'continuity' for the maximum inter-link angle of greater than 30 degrees and 'non-continuity' for the maximum inter-link angle of not greater than 30 degrees. The reference angle for specifying the continuity or non-continuity is not restricted to 30 degrees but may be set arbitrarily.

The right drawing shows an example of the continuity or non-continuity specification at an intersection of three links. When three links L4 to L6 intersect at an intersection, an angle A46 between the links L4 and L6 is the maximum inter-link angle. The angle A46 of not greater than 30 degrees gives the specification of non-continuity.

In Case 4, multiple connection roads at an intersection are the mixture of those in the same road class as and those in a different road class from the object road, and the object road has non-continuity with any connection road. In this case, the polygon convex process is performed individually for the respective roads.

This modified example executes the polygon terminal processing for three or more roads and accordingly has some difference in the polygon convex process from that of the embodiment (see FIG. 9). The polygon convex process of the modified example is described briefly with reference to the flowchart of FIG. 9. The polygon convex process of the modified example specifies the continuity or non-continuity of connection roads (step S120A) after convexing the terminal geometry of the polygon of the object road (step S120). While the connection status in Case 4 (see FIG. 17) specifies the continuity or non-continuity of an object road with a connection road, the polygon convex process of this modified example specifies the continuity or non-continuity of connection roads at step S120A. The criterion described above is also applied to the continuity or non-continuity specification of the connection roads. The connection roads having a connection angle of greater than 30 degrees are specified to have the 'continuity'.

The processing flow of this modified example terminates the polygon convex process when the connection roads have non-continuity. In this case, elimination of an extra or unnecessary part (step S123) is skipped, irrespective of the widths and the priorities of the object road and the connection road. The object road accordingly keeps the convex terminal geometry (the state after the processing of step S120). When the connection roads have the continuity, the polygon convex process of the modified example executes the subsequent processing of steps S121 to S123 in the same manner as the polygon convex process of the embodiment. The processing flow is changed corresponding to the continuity or non-continuity of the connection roads, since elimination of an extra or unnecessary part (step S123) under the non-continuity condition may damage the appearance in map drawing.

In Case 5, no connection roads at an intersection are in the same road class as the object road, while some of the connection roads at the intersection are in an identical road class. In this case, the object road is subjected to the polygon convex process.

In Cases 6 and 7, all roads at an intersection are in different road classes, while at least one connection road has the same width as that of the object road. The object road and the connection road of the same width have the continuity in Case 6. In this case, the connection process is performed for all the roads of the same width. The object road and the connection road of the same width have non-continuity in Case 7. In this case, the object road is subjected to the polygon convex process.

In Cases 8 and 9, all roads at an intersection are in different road classes, while no connection road has the same width as that of the object road. At least one connection road has the greater width than the width of the object road in Case 8. In this case, the object road is left to have the rectangular terminal geometry. All the connection roads have the smaller width than the width of the object road in Case 9. In this case, the object road is subjected to the polygon convex process.

Figure 18:
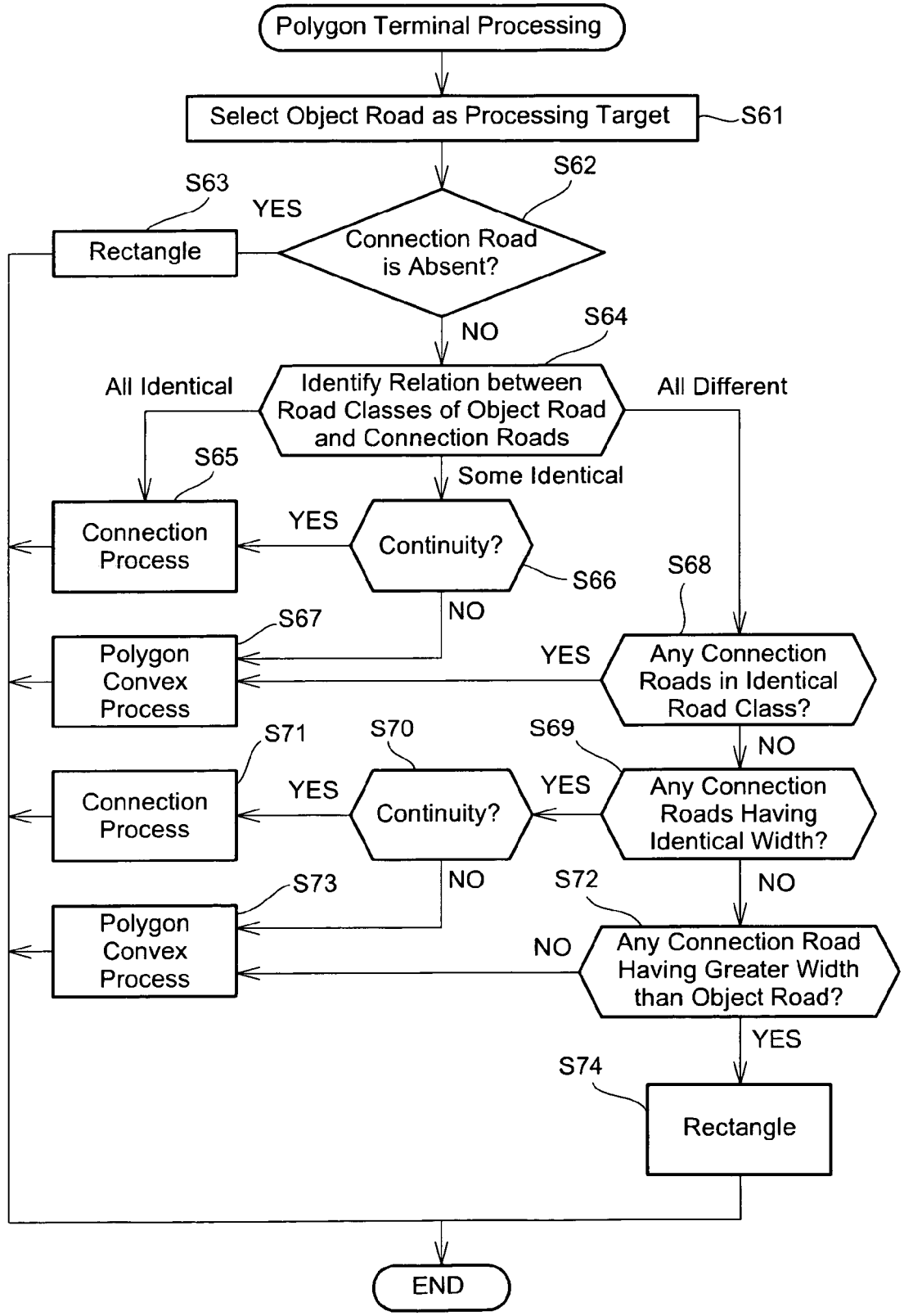
FIG. 18 is a flowchart showing a modified flow of polygon terminal processing.

FIG. 18 is a flowchart showing a modified flow of polygon terminal processing. This modified processing flow is set to sequentially determine satisfaction or non-satisfaction of the conditions set in Cases 1 to 9 of FIG. 17 in this order. The order of determination for satisfaction of the conditions in the respective cases of FIG. 17 may be set arbitrarily, for example, to a reverse order of Cases 9 to 1. The flowchart of the polygon terminal processing is modified according to this order of determination. The processing flow accordingly shows only one example of the selective use of the terminal processing techniques according to the cases of FIG. 17.

In this modified polygon terminal processing, the CPU first selects an object road as a processing target (step S61) and determines the satisfaction or non-satisfaction of the condition in Case 1, that is, the presence or the absence of any connection road (step S62). When the object road has no connection road, the condition of Case 1 is fulfilled. The CPU accordingly leaves the rectangular terminal geometry of the object road (step S63).

When the object road has any connection road (step S62), the CPU specifies the relation between the road classes of the object road and the connection roads (step S64). When the object road and the connection roads are all in an identical road class, the condition of Case 2 is fulfilled. The CPU accordingly performs the connection process (step S65).

When the connection roads are the mixture in the same road class as and in a different road class from the object road (step S64) and the object road and the connection road in the same road class have the continuity (step S66), the conditions of Case 3 are fulfilled. The CPU accordingly performs the connection process (step S65). When the object road and the connection road have non-continuity (step S66), the conditions of Case 4 are fulfilled. The CPU accordingly performs the polygon convex process (step S67).

When all the connection roads are in different road class from the object road (step S64) and some of the connection roads are in an identical road class (step S68), the conditions of Case 5 are fulfilled. The CPU accordingly performs the polygon convex process (step S67).

When all the connection roads are in different road classes (step S68), the CPU determines whether any two connection roads have an identical road width (step S69). When some of the connection roads have an identical road width (step S69) and the continuity (step S70), the conditions of Case 6 are fulfilled. The CPU accordingly performs the connection process (step S71). When the connection roads of the identical road width have non-continuity (step S70), the conditions of Case 7 are fulfilled. The CPU accordingly performs the polygon convex process (step S73).

When no connection roads have an identical road width (step S69) and at least one connection road has the greater width than the width of the object road (step S72), the conditions of Case 8 are fulfilled. The CPU accordingly leaves the rectangular terminal geometry of the object road (step S74). When there is no connection road having the greater width than the width of the object road (step S72), the conditions of Case 9 are fulfilled. The CPU accordingly performs the polygon convex process (step S73).

Figure 19:
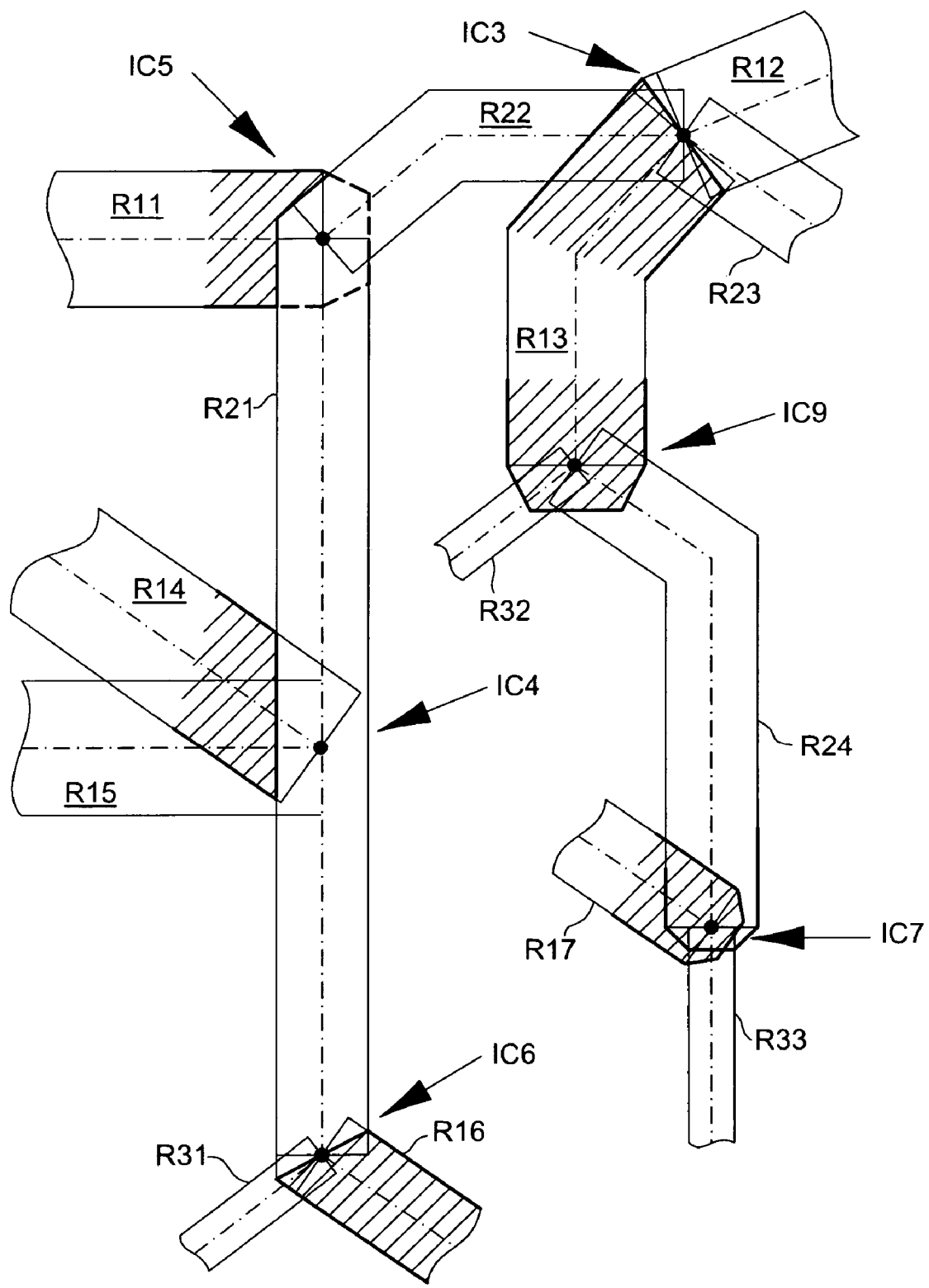
FIG. 19 shows one example of the modified polygon terminal processing.

FIG. 19 shows one example of the modified polygon terminal processing. In the illustrated example, road polygons R11 to R17 represent national highways, road polygons R21 to R24 represent prefectural roads, and road polygons R31 to R33 represent local roads.

The national highways R12 and R13 and the prefectural roads R22 and R23 cross at an intersection IC3. Since there is continuity in the connection status of the national highways R12 and R13 and in the connection status of the prefectural roads R22 and R23, the connection at the intersection IC3 corresponds to Case 3 in the table of FIG. 17. The connection process is thus selected for the polygon terminal processing of the national highways R12 and R13 and for the polygon terminal processing of the prefectural roads R22 and R23. The result of the connection process on the national highway R13 is shown by the thick solid line and hatching.

The national highways R14 and R15 and the prefectural road R21 cross at an intersection IC4. Since there is no continuity in the connection status of the national highways R14 and R15, the connection at the intersection IC4 corresponds to Case 4 in the table of FIG. 17. The polygon convex process is thus selected for the polygon terminal processing of the national highways R14 and R15. The result of the polygon convex process on the national highway R14 is shown by the thick solid line and hatching.

The national highway R11 and the prefectural roads R21 and R22 cross at an intersection IC5. When the national highway R11 is specified as an object road, the connection roads R21 and R22 are of the identical road class but are different from the road class of the object road R11. The connection at the intersection IC5 thus corresponds to Case 5 in the table of FIG. 17, and the polygon convex process is selected for the polygon terminal processing of the national highway R11. In this example, the object road R11 has the higher priority than those of the connection roads R21 and R22, so that an unnecessary part is eliminated after the polygon convex process. The result of the polygon convex process with elimination on the national highway R11 is shown by the thick solid line and hatching. When the object road R11 is a local road with the lower priority than those of the connection roads R21 and R22 and has the smaller width than those of the connection roads R21 and R22, the object road R11 has a convex terminal geometry as shown by the thick broken line.

With regard to the prefectural roads R21 and R22, the connection at the intersection IC5 corresponds to Case 3 in the table of FIG. 17. The connection process is thus selected for the polygon terminal processing of the prefectural roads R21 and R22. The result of such processing is omitted from the illustration to avoid the complication.

The national highway R16, the prefectural road R21, and the local road R31 cross at an intersection IC6. In this example, the national highway R16 and the prefectural road R21 have an identical width and are regarded to have the continuity in their connection status. The connection at the intersection IC6 corresponds to Case 6 in the table of FIG. 17. The connection process is thus selected for the polygon terminal processing of the national highway R16 and the prefectural road R21. The result of the connection process on the national highway R16 is shown by the thick solid line and hatching.

The national highway R17, the prefectural road R24, and the local road R33 cross at an intersection IC7. In this example, the national highway R17 and the prefectural road R24 have an identical width but are regarded to have no continuity in their connection status. The connection at the intersection IC7 corresponds to Case 7 in the table of FIG. 17. The polygon convex process is thus selected for the polygon terminal processing of the national highway R17 and the prefectural road R24. The results of the polygon convex process on the national highway R17 and the prefectural road R24 are shown by the thick solid lines and hatching.

The national highway R13, the prefectural road R24, and the local road R32 cross at an intersection IC9. When the national highway R13 is specified as an object road, the connection roads R24 and R32 have the narrower widths than the width of the object road R13. With regard to the national highway R13, the connection at the intersection IC9 corresponds to Case 9 in the table of FIG. 17. The polygon convex process is thus selected for the polygon terminal processing of the national highway R13. The result of the polygon convex process on the national highway R13 is shown by the thick solid line and hatching.

When the prefectural road R24 or the local road R32 is specified as an object road at the intersection IC9, one of the connection roads R13 has the greater width than the object road R24 or R32. With regard to the prefectural road R24 and the local road R32, the connection at the intersection IC9 corresponds to Case 8 in the table of FIG. 17. The terminal geometries of the prefectural road R24 and the local road R32 are thus not modified but are kept rectangular. Such selective use of the terminal processing techniques in this modified example is only illustrative and may be modified according to various conditions.

F. Edge Line Processing

Figure 20:
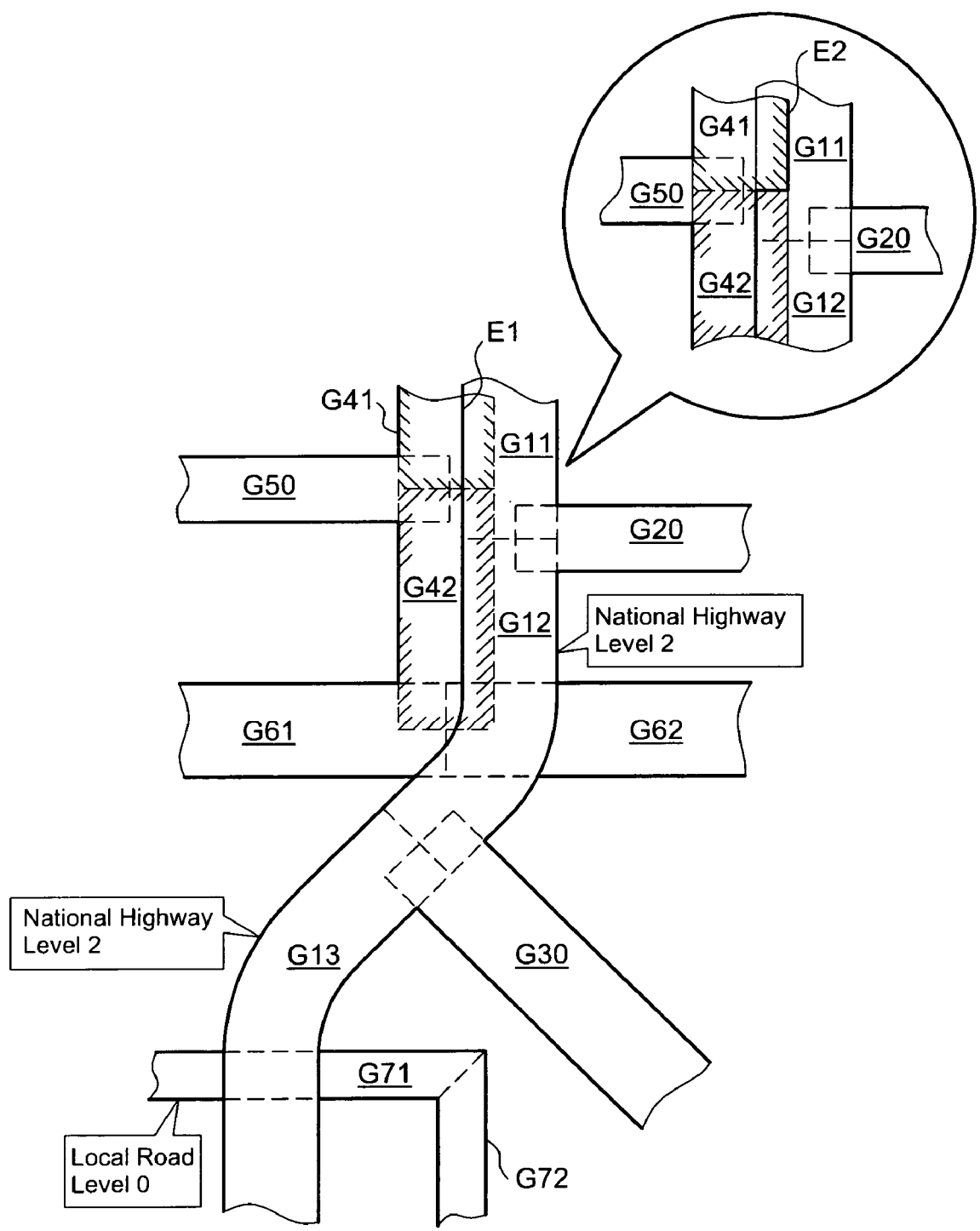
FIG. 20 shows one example of edge line processing.

FIG. 20 shows one example of edge line processing. The edge line processing eliminates unnecessary part of generated edge lines according to the connection status or the overlap status of the object road polygon with another road polygon. The illustrated example of FIG. 20 includes road polygons G11 to G13, G20, G30, G41 and G42, G50, G61 and G62, and G71 and G72. The road polygons G11 to G13, G41 and G41, G61 and G62, and G71 and G72 are respectively grouped. The edge lines of these road polygons before the edge line processing are expressed by thin solid lines and thin broken lines, and the edge lines after the edge line processing are expressed by thick solid lines.

The polygon G30 is processed by the edge line processing. Before the edge line processing, the polygon G30 has edge line around its whole circumference. The polygon G30 connects with the polygons G13 and G12. The connection of the polygon G30 with the polygons G13 and G12 is clearly detectable by the presence of a node at the intersection of these polygons G30, G13, and G12. In this connection state, the edge lines are cut at the cross points of the side lines of the respective polygons G30, G12, and G13 for elimination of unnecessary part as shown by the broken lines.

Another processing target is the polygon G71, which is a local road at the altitude level '0'. The polygon G13 intersecting the polygon G71 is a national highway at the altitude level '2'. Namely the polygon G13 at the altitude level '2' is an elevated road crossing over the polygon G71 at the altitude level '0'. In this crossover state, the edge line of the upper polygon G13 has the priority and is left to express an elevated road, while part of the edge line of the lower polygon G71 placed inside the polygon G13 is eliminated as shown by the broken line.

The procedure of this embodiment, however, regulates the drawing order of polygons to express an elevated road without actually eliminating the edge lines. This technique first draws the lower polygon G71 and then draws the upper polygon G13 over the drawn lower polygon G71. The overdrawing of the upper polygon G13 automatically eliminates the unnecessary edge line of the lower polygon G71 to express the illustrated state.

The polygons G11 and G12 and the polygons G41 and G42 are also processed by the edge line processing. The polygons G11 and G12 are grouped (group 1) to express one continuous road, while the polygons G41 and G42 are grouped (group 4) to express one continuous road. These two roads run parallel in relatively close locations.

In this case, the polygons of the group 1 may partly overlap the polygons of the group 4. For the clear recognition of the overlap, the polygons G41 and G42 are partly hatched. The roads of two different groups may actually overlap, for example, as an elevated road and a ground road or may actually not overlap at all. The roads actually apart from each other may be expressed to have an overlap. Such phantom overlap may be ascribed to the setting values of the widths for generation of road polygons from links (see FIG. 3).

The procedure of this embodiment executes the edge line processing with consistently giving preference to one of the two groups. In the illustrated example, the group 1 takes priority over the group 4 in the edge line processing. Namely unnecessary part of the edge lines is always eliminated from the polygons in the group 4 in the overlap state of the polygons in the group 1 with the polygons in the group 4. Such elimination is also implemented by regulating the drawing order and drawing the polygons in the group 1 over the drawn polygons in the group 4.

The upper right illustration of FIG. 20 gives an example of processing with inconsistency of the priorities between the groups. In this illustrated example, the polygon G12 takes priority over the polygon G42, whereas the polygon G41 takes priority over the polygon G11. A resulting edge line E2 is accordingly bent stepwise on the boundary between the polygons G41 and G42. This gives awkward display in map drawing.

The edge line processing of this embodiment, however, gives a continuously drawn edge line E1 with regard to the polygons in the group 1 and accordingly gives natural display in map drawing. The priority set for any polygon included in the same group as an object road polygon is reflected on the edge line processing of the object road polygon. In the illustrated example, the priorities set for the polygons G12 and G13 in the same group as the polygon G11 are referred to for the edge line processing of the polygon G11. When the drawing order is set to give priority to the polygon G13 over the polygon G42, this drawing order is applied to the edge line processing of the polygon G11.

The edge line processing of this embodiment is performed as a combination of these processing operations. The processing of the polygons G20 G40, and G61 and G62 is not specifically described here but is performed by suitable combinations of these processing operations according to the connection status with other polygons.

Figure 21:
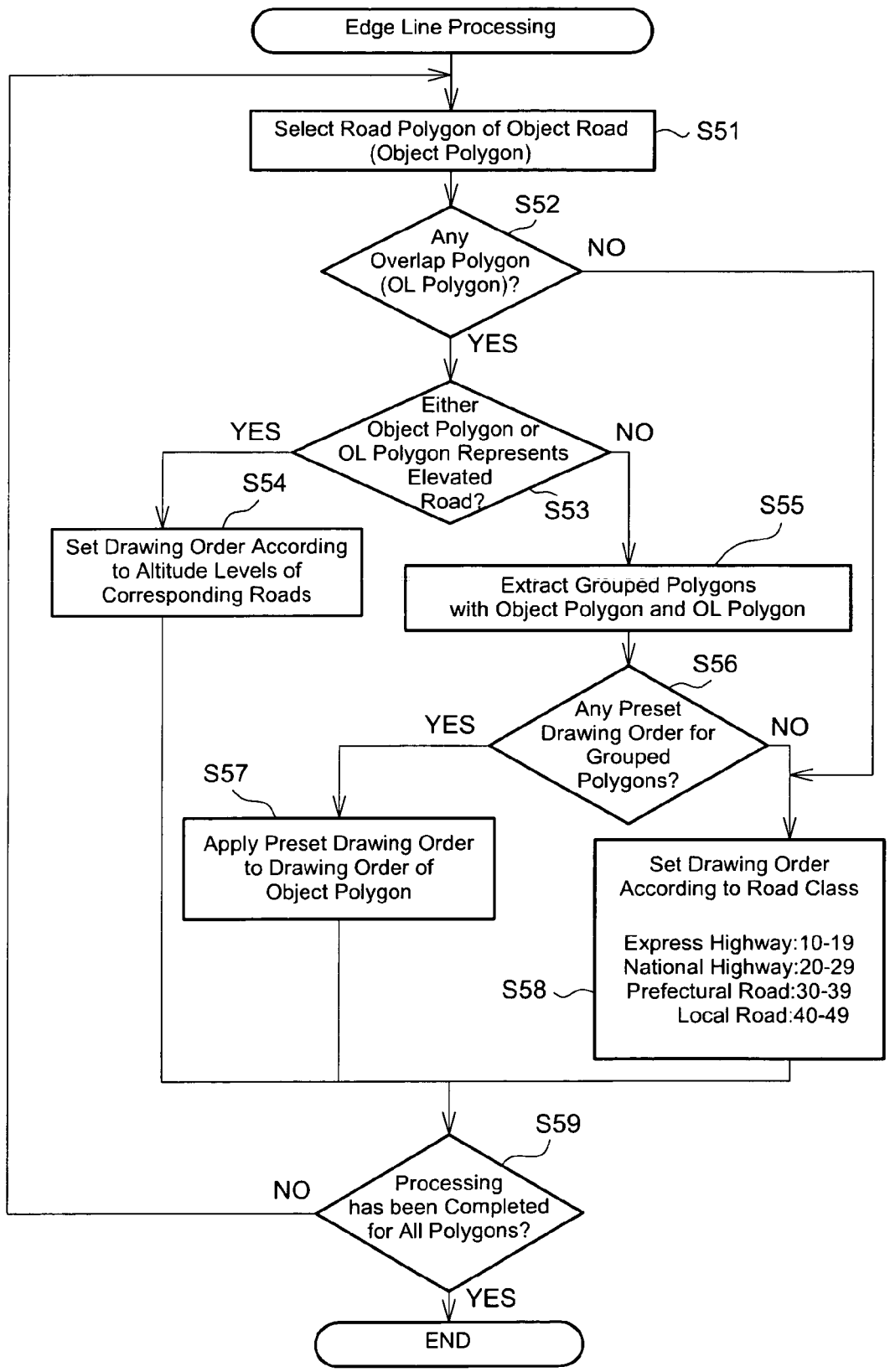
FIG. 21 is a flowchart showing a flow of edge line processing.

FIG. 21 is a flowchart showing the details of the edge line processing executed at step S50 in the road polygon generation process (see FIG. 2). The edge line processing shown in FIG. 20 is performed according to this flowchart.

In the edge line processing, the CPU selects a polygon of an object road as a processing target (step S51) and identifies the presence of any overlap polygon (hereafter referred to as 'OL polygon') partly overlapping the object road polygon (step S52). In the absence of any OL polygon, there is no need to take into account the overlap status with other polygons. The CPU thus sets the drawing order of the object road polygon, simply based on its road class (step S58).

The smaller value in the drawing order represents the higher priority and a polygon with the smaller value in the drawing order is drawn over other polygons with the greater values. In the absence of any OL polygon, the greatest value in a preset range for each road class is set to the drawing order of the object road polygon. For example, when the object road polygon is a national highway without any OL polygon, the greatest value '29' in a preset range of 20 to 29 for the national highways is set to the drawing order of the object road polygon.

In the presence of any OL polygon (step S52), on the other hand, the CPU subsequently specifies whether either the object road polygon or the OL polygon represents an elevated road (step S53). The presence of an elevated road is specified by comparison between the altitude level of the object road polygon and the altitude level of the OL polygon.

Upon specification of an elevated road, the drawing order of the object road polygon is set according to its altitude level (step S54). As described previously with regard to the processing of the polygon G71 in FIG. 20, the drawing order is set to give priority to the polygon with the higher altitude level to the polygon with the lower altitude level.

Upon specification of no elevated road (step S53), on the other hand, the CPU extracts all the polygons included in group of the object road polygon and in the group of the OL polygon (step S55). In the illustrated example of FIG. 4, when the object road polygon is G11, the CPU extracts the polygons G12 and G13 grouped with the polygon G11 and the polygon G42 grouped with the OL polygon G41 drawn over the polygon G11.

The CPU then determines whether the drawing order has been set for any of the extracted polygons in the groups (step S56). When there is the preset drawing order, the preset drawing order is applied to the drawing order of the object road polygon (step S57). When there is no preset drawing order, the drawing order of the object road polygon is set according to the road class of the object road polygon (step S58). This series of edge line processing ensures the consistency of the priorities between the polygons in one group and the polygons in another group and thus gives the good appearance in map drawing. The CPU repeats this series of edge line processing until completion of the processing with regard to all the polygons (step S59). The CPU eliminates unnecessary edge lines in the course of the edge line processing, although this elimination step is omitted from the flowchart. This elimination step has been described above, for example, with regard to the polygon G30 shown in FIG. 20.

G. Effects and Modifications

As described above, the digital map data processing system of the embodiment applies the polygon grouping technique to the edge line processing and selectively uses the terminal processing technique by taking into account the road classes of the object road and the connection road. The digital map data processing system of the embodiment accordingly generates road polygon data to give the good display appearance in map drawing with relatively light load.

The embodiment and its modified examples discussed above are to be considered in all aspects as illustrative and not restrictive. There may be many other modifications, changes, and alterations without departing from the scope or spirit of the main characteristics of the present invention. For example, the processing operations described in the embodiment may not be integrally executed but may be partly omitted according to the requirements. Any suitable processing methods other than those described in the embodiment may be applied to specify the terminal geometry of each road polygon and to adjust the edge lines. These other processing methods may be executed additionally with the processing techniques described in the above embodiment or may be executed selectively in place of the processing techniques of the embodiment. Any of the processing operations executed by the software configuration in the embodiment may be actualized by the hardware configuration.

What is claimed is:

1. A digital map data processing system that generates map data for drawing a map, said digital map data processing system comprising:

a base data input module that inputs geometric data and attributes required for specification of geometry of multiple road polygons, which are used to draw roads included in the map data; and a polygon data generation module that selects one of multiple terminal processing techniques to be applied for specification of terminal geometry of each road polygon, based on at least part of attributes of an object road as a processing target and a connection road to be connected to the object road, geometry of the object road and the connection road determined by the input geometric data, and directions of the object road and the connection road, said polygon data generation module applying the selected terminal processing technique to specify the terminal geometry of each road polygon according to the geometric data and generating polygon data required for drawing the road polygons, wherein said polygon data generation module selects the terminal processing technique based on a result of a comparison between road classes of the object road and the connection road, and wherein when there are plural connection roads relative to one object road, said polygon data generation module changes over conditions for the selection of the terminal processing technique between a case where any of the plural connection roads and the object road are included in an identical road class and any other case.

2. A digital map data processing system in accordance with claim 1, wherein the geometric data comprises network data that represents a connection of plural roads by means of nodes and links, and
wherein said polygon data generation module defines the geometry of each road polygon about one link by the specified terminal geometry of the road polygon and side lines of the road polygon given as sets of points located at preset distances about the link.

3. A digital map data processing system in accordance with claim 1, wherein said polygon data generation module selects the terminal processing technique, based on at least either a result of comparison between widths of the object road and the connection road and a connection angle between the object road and the connection road.

4. A digital map data processing system in accordance with claim 1, wherein the multiple terminal processing techniques include a technique of defining the terminal geometry of a road polygon representing the object road by a line segment that interconnects cross points of side lines of the object road and side lines of the connection road.

5. A digital map data processing system in accordance with claim 1, wherein the multiple terminal processing techniques include a technique of defining the terminal geometry of a road polygon representing the object road by a polygonal line that interconnects side lines of the object road to express the object road as a convex polygon.

6. A digital map data processing system in accordance with claim 1, further comprising:
a grouping module that groups at least part of the multiple road polygons according to a preset rule,
wherein said polygon data generation module generates polygon data required for drawing the road polygons from the geometric data based on a result of the grouping.

7. A digital map data processing system in accordance with claim 6, wherein the geometric data comprises network data that represents connection of plural roads by means of nodes and links, and
said polygon data generation module defines the geometry of each road polygon about one link by the specified terminal geometry of the road polygon and side lines of the road polygon given as sets of points located at preset distances about the link.

8. A digital map data processing system in accordance with claim 6, wherein said grouping module utilizes at least either of a name of each road represented by each road polygon and a traffic regulation set on the road for the grouping.

9. A digital map data processing system in accordance with claim 6, wherein the attributes include a road class of each road represented by each road polygon, and
said grouping module sets road polygons of an identical road class in one group.

10. A digital map data processing system in accordance with claim 6, wherein said grouping module utilizes connection angles of the multiple road polygons for the grouping.

11. A digital map data processing system in accordance with claim 6, wherein said polygon data generation module comprises:
an edge line processing module that adds edge line data, which represents an edge line of each road represented by each road polygon, to the road polygon,
said edge line processing module generates the edge line data such that road polygons set in one group have a continuous edge line.

12. A digital map data processing system that generates map data for drawing a map, said digital map data processing system comprising:
a base data input module that inputs geometric data and attributes required for specification of geometry of multiple road polygons, which are used to draw roads included in the map data; and
a polygon data generation module that selects one of multiple terminal processing techniques to be applied for specification of terminal geometry of each road polygon, based on at least part of attributes of an object road as a processing target and a connection road to be connected to the object road, geometry of the object road and the connection road determined by the input geometric data, and directions of the object road and the connection road,
said polygon data generation module applying the selected terminal processing technique to specify the terminal geometry of each road polygon according to the geometric data and generating polygon data required for drawing the road polygons, wherein said polygon data generation module selects the terminal processing technique based on a result of a comparison between road classes of the object road and the connection road, and wherein when there are plural connection roads relative to one object road, said polygon data generation module changes over conditions for the selection of the terminal processing technique between a case where all the plural connection roads and the object road are included in an identical road class and any other case.

13. A digital map data processing system in accordance with claim 12, wherein said polygon data generation module selects the terminal processing technique, based on at least either a result of comparison between widths of the object road and the connection road and a connection angle between the object road and the connection road.

14. A digital map data processing system in accordance with claim 12, wherein the multiple terminal processing techniques include a technique of defining the terminal geometry of a road polygon representing the object road by a line segment that interconnects cross points of side lines of the object road and side lines of the connection road.

15. A digital map data processing system in accordance with claim 12, wherein the multiple terminal processing techniques include a technique of defining the terminal geometry of a road polygon representing the object road by a polygonal line that interconnects side lines of the object road to express the object road as a convex polygon.

16. A recording medium that stores a computer program executable by a processor to generate digital map data for drawing a map, said computer program comprising:
a subprogram for inputting geometric data and attributes required for specification of geometry of multiple road polygons, which are used to draw roads included in the map data;
a subprogram for selecting one of multiple terminal processing techniques to be applied for specification of terminal geometry of each road polygon based on at least part of attributes of an object road as a processing target and a connection road to be connected to the object road, geometry of the object road and the connection road determined by the input geometric data, and directions of the object road and the connection road; and a subprogram for applying the selected terminal processing technique to specify the terminal geometry of each road polygon according to the geometric data and generating polygon data required for drawing the road polygons, wherein the selecting of the one of the terminal processing techniques is based on a result of comparison between road classes of the object road and the connection road, and wherein when there are plural connection roads relative to one object road, the conditions for the selection of the terminal processing technique are changed between a case where any of the plural connection roads and the object road are included in an identical road class and any other case.

17. A recording medium in accordance with claim 16, wherein said computer program further comprises:
- a subprogram for grouping at least part of the multiple road polygons according to a present rule,
- wherein the generating of the polygon data required for drawing the road polygons from the geometric data is based on a result of the grouping.

18. A recording medium that stores a computer program executable by a processor to generate digital map data for drawing a map, said computer program comprising:
- a subprogram for inputting geometric data and attributes required for specification of geometry of multiple road polygons, which are used to draw roads included in the map data;
- a subprogram for selecting one of multiple terminal processing techniques to be applied for specification of terminal geometry of each road polygon based on at least part of attributes of an object road as a processing target and a connection road to be connected to the object road, geometry of the object road and the connection road determined by the input geometric data, and directions of the object road and the connection road; and
- a subprogram for applying the selected terminal processing technique to specify the terminal geometry of each road polygon according to the geometric data and generating polygon data required for drawing the road polygons, wherein the selecting of the one of the terminal processing techniques is based on a result of a comparison between road classes of the object road and the connection road, and wherein when there are plural connection roads relative to one object road, the conditions for the selection of the terminal processing technique are changed between a case where all of the plural connection roads and the object road are included in an identical road class and any other case.

* * * * *